United States Patent [19]
Moran et al.

[11] Patent Number: 5,880,743
[45] Date of Patent: Mar. 9, 1999

[54] APPARATUS AND METHOD FOR IMPLEMENTING VISUAL ANIMATION ILLUSTRATING RESULTS OF INTERACTIVE EDITING OPERATIONS

[75] Inventors: Thomas P. Moran, Palo Alto; Patrick Chiu, Menlo Park; William Van Melle, Los Altos, all of Calif.; Gordon Kurtenbach, Toronto, Canada

[73] Assignee: Xerox Corporation, Stamford, Conn.

[21] Appl. No.: 976,907

[22] Filed: Nov. 24, 1997

Related U.S. Application Data

[63] Continuation of Ser. No. 377,550, Jan. 24, 1995, abandoned.
[51] Int. Cl.⁶ .................................................. G06T 13/00
[52] U.S. Cl. ........................... 345/473; 707/530; 345/358
[58] Field of Search ..................... 707/530, 531, 707/536, 541, 540; 345/473, 474, 348, 349, 358

[56] References Cited

U.S. PATENT DOCUMENTS

| | | | |
|---|---|---|---|
| 5,404,442 | 4/1995 | Foster et al. | 395/159 |
| 5,416,900 | 5/1995 | Blanchard et al. | 395/155 |
| 5,442,742 | 8/1995 | Greyson et al. | 395/146 |
| 5,544,295 | 8/1996 | Capps | 395/173 |

FOREIGN PATENT DOCUMENTS 92311712  7/1993  European Pat. Off. .

OTHER PUBLICATIONS

Cowart, *Mastering Windows 3.1*, SYBEX, 1993, pp. 421–428.

*After Effects User Manual*, Adobe Systems Incorporated, 1994, pp. 126, 230–244.

Smith et al., "Designing the Star User Interface", *BYTE*, vol. 7, No.4, Apr. 1982, pp. 242–282.

"Issues in Combining Marking and Direct Manipulation Techniques" by Gordon Kurtenbach and William Buxton, Nov. 11–13, 1991, UIST'91, 137–144.

aha! *InkWriter at a Glance—Quick Reference Guide*, aha! software corporation (1993).

*Animation: From Cartoons to the User Interface*, Bay–Wiei Chang and David Unger, UIST '93: User Interface Software and Technology, Atlanta, Ga, Nov. 3–5, 1993. pp. 45–55.

*Liveboard: A Large Interactive Display Supporting Group Meetings, Presentationa and Remote Collaboration*, Scott Elrod, et al., Proceedings of CHI '92, the ACM Conference on Human Factors in Computing Systems, May 3–7, 1992, pp. 599–607.

*Second Edition Computer Graphics Princicples and Practice*, James D. Foley, Andries van Dam, Steven K. Feiner and John F. Hughes, Animation, chapter 21, (1990).

*Primary Examiner*—Stephen S. Hong
*Attorney, Agent, or Firm*—Fay, Sharpe, Beall, Fagan, Minnich & McKee

[57] ABSTRACT

An apparatus and method for animating editing changes on a display device is provided. The invention is designed to operate preferably with a graphical editing system that permits both handwritten and typewritten data entry. Both the primary changes made by the user and the contextual changes resulting from the primary changes are animated at a visually apparent rate in multiple steps to permit a user and other viewers of the display device to understand the effects of an editing change on surrounding objects. The number of steps in which the changes are animated depends on the number of changes which must be made and the operation performed.

34 Claims, 34 Drawing Sheets

Wall Street Journal
USA Today
Los Angeles Times
158

FIG. 8(i)

Wall Street Journal
USA Today

Los Angeles Times

FIG. 8(j)

Wall Street Journal
USA Today
Los Angeles Times

FIG. 8(k)

USA Today
Wall Street Journal
Los Angeles Times

FIG. 8(l)

USA Today
Wall Street Journal
Los Angeles Times

FIG. 8(m)

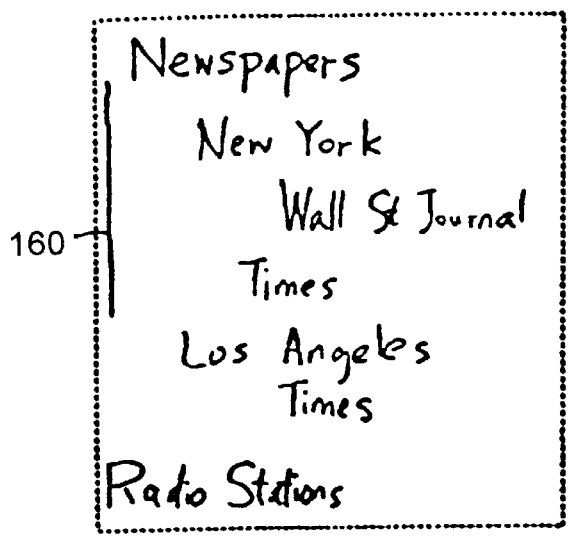
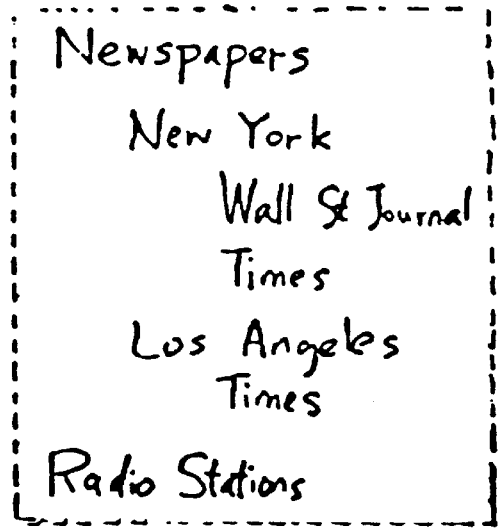
FIG. 9(a)　　　　　FIG. 9(b)
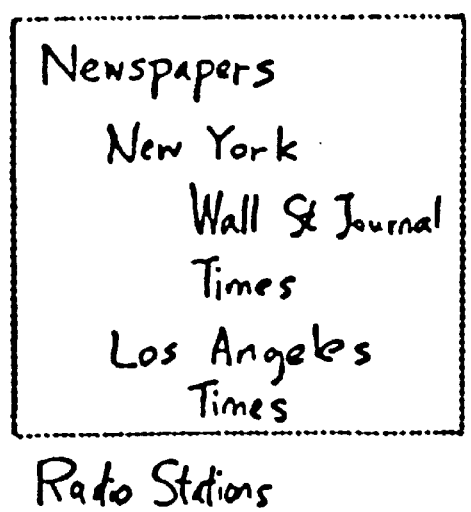
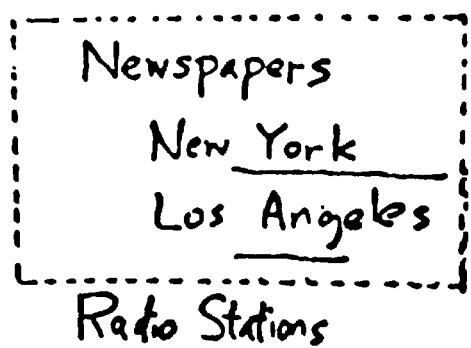
FIG. 9(c)　　　　　FIG. 9(d)

Wall Street Journal /166
USA Today
Los [Angeles] Times
           167

FIG. 10(g)

Wall Street Journal
[Angeles]
USA Today
Los Times

FIG. 10(h)

168
Wall Street Journal
USA Today
Los Angeles Times

FIG. 10(i)

Wall Street Journal
USA        Today
Los Angeles Times

FIG. 10(j)

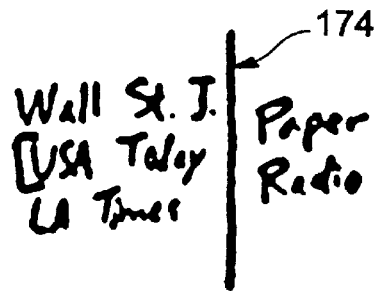
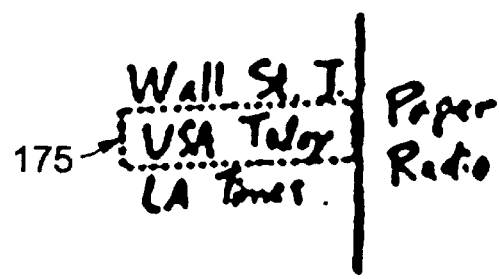
FIG. 12(a)  FIG. 12(b)
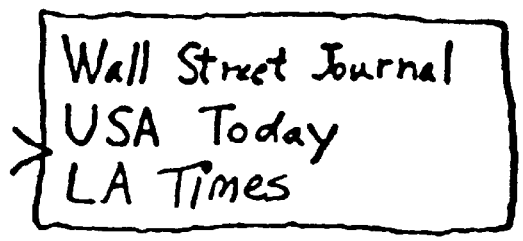
FIG. 12(c)
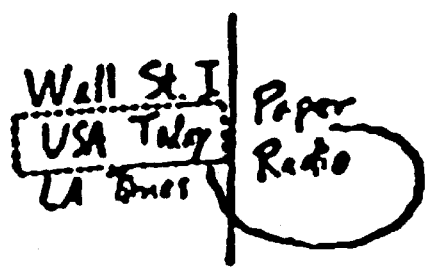
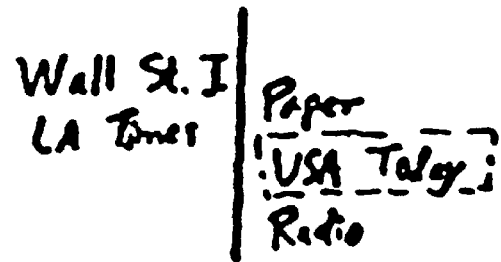
FIG. 12(d)  FIG. 12(e)

| 1 | 2 | 3 |
|---|---|---|
| H | He | Li |
| 1.0 | 4.0 | 7.0 |

FIG. 12(f)

| 1 | 2 | 3 |
|---|---|---|
| H | He | Li |
| 1.0 | 4.0 | 7.0 |

FIG. 12(g)

| 1 | 2 | 3 |
|---|---|---|
| H | He | Li |
| 1.0 | 4.0 | 7.0 |

| 1 | 2 | 3 |
|---|---|---|
| 1.0 | 4.0 | 7.0 |
| H | He | Li |

FIG. 12(i)

|  | Slides | Time | Speaker |
|---|---|---|---|
| Introduction | 2 | 10 | Hillary |
| Economy | 6 | 25 | Bill C. |
| Health | 4 | 20 | Hilary C. |
| Environment | 8 | 15 | Al G |
| Conclusion | 2 | 10 | Bill |

FIG. 17

|  | Slides | Time | Speaker |
|---|---|---|---|
| Introduction | 2 | 10 | Hillary |
| Economy | 6 | 25 | Bill C. |
| Health | 4 | 20 | Hilary C. |
| Environment | 8 | 15 | Al G |
| Conclusion | 2 | 10 | Bill |

FIG. 18

Now is the time
for all good men

FIG. 19(a)

Now good men
Now is the time
for all

FIG. 19(b)

Now is the time
for all good men

FIG. 19(c)

Now is the good men time
for all

FIG. 19(d)

Now is the time
for all good men
to come to the aid
of their party.

FIG. 19(e)

Now is the time
for all           en
to c            aid
of their party.

FIG. 19(f)

Now is  the time
for all  good men

FIG. 19(g)

the time  Now is
good men  for all

FIG. 19(h)

{ 
1. Jane: printers, modems
2. Tim: dialogs, ⌃icons ⟵185
3. Angie: display network,
windows, ⟵184
testing,
debugging

FIG. 20(a)

{
1. Jane: printers, modems
2. Tim: dialogs, icons
3. Angie: display network,
windows,
testing,
debugging

FIG. 20(b)

1. Jane:   printers, modems
2. Tim:    dialogs, icons
3. Angie:  display network
windows, testing, debugging

FIG. 20(c)

1. Jane:   printers, modems
2. Tim:    dialogs, icons
3. Angie:  display netwindows, testing, debugging

FIG. 20(d)

1. Jane: printers, modems
2. Tim: dialogs, icons
3. Angie: display network, windows, testing, debugging

FIG. 20(e)

1. Jane: printers, modems
2. Tim: dialogs, icons
3. Angie: display windows, network, testing, debugging

FIG. 20(f)

1. Jane: printers, modems
2. Tim: dialogs, icons
3. Angie: *display windows*, network, testing, debugging

FIG. 20(g)

1. Jane: printers, modems
2. Tim: dialogs, icons
3. Angie: *displays*, network, testing, debugging

FIG. 20(h)

1. Jane: printers, modems
2. Tim: dialogs, icons
3. Angie: display Windows, network, testing, debugging

FIG. 20(i)

1. Jane: printers, modems
2. Tim: dialogs, Windows, icons
3. Angie: display network, testing, debugging

FIG. 20(j)

1. Jane: printers, modems
2. Tim: dialogs, windows, icons
3. Angie: display network, testing, debugging

FIG. 20(k)

Adage #3: all that glitters is not gold
        189↗            ↘187

FIG. 21(a)

Adage #3: all that glitters not    gold

FIG. 21(b)

Adage #3:   all that glittenot      gold

FIG. 21(c)

Adage #3:   all that glitnot is    gold

FIG. 21(d)

Adage #3:   all that glitters is    gold

FIG. 21(e)

Adage #3:   all thatglitters is    gold

FIG. 21(f)

Adage #3: all th̃at glitters is  gold

FIG. 21(g)

Adage #3: all̃t̃h̃at glitters is  gold

FIG. 21(h)

Adage #3: ãl̃b̃that glitters is  gold

FIG. 21(i)

Adage #3: ñãll that glitters is  gold

FIG. 21(j)

Adage #3: ñõt all that glitters is gold

FIG. 21(k)

Adage #3:  all that glitters is not gold
          ∧

FIG. 22(a)

Adage #3:  all that glitters is ⁿᵒᵗ  gold

FIG. 22(b)

not

Adage #3:  all that glitters is      gold

FIG. 22(c)

not

Adage #3:  all that glitters is      gold

FIG. 22(d)

not

Adage #3:  all that glitters is      gold

FIG. 22(e)

not

Adage #3:  all that glitters is      gold

FIG. 22(f)

$$\text{not}$$

Adage #3: all that glitters is gold

FIG. 22(g)

$$\text{not}$$

Adage #3: all that glitters is gold

FIG. 22(h)

$$\text{not}$$

Adage #3: all that glitters is gold

FIG. 22(i)

Adage #3: $\overset{\text{not}}{\phantom{x}}$ all that glitters is gold

FIG. 22(j)

Adage #3: not all that glitters is gold

FIG. 22(k)

Adage #3: ∧all that glitters is not gold

FIG. 23(a)

Adage #3:         all that glitters is not gold

FIG. 23(b)

Adage #3: not all that glitters is         gold

FIG. 23(c)

Adage #3: not all that glitters is gold

FIG. 23(d)

Adage #3: all that glitters is not gold

FIG. 24(a)

Adage #3: not all that glitters is       gold

FIG. 24(b)

Adage #3: not all that glitters is       gold

FIG. 24(c)

Adage #3: not all that glitters is       gold

FIG. 24(d)

Adage #3: not all that glitters is       gold

FIG. 24(e)

Adage #3: not all that glitters is    gold

FIG. 24(f)

Adage #3: not all that glitters is    gold

FIG. 24(g)

Adage #3: not all that glitters is   gold

FIG. 24(h)

Adage #3: not all that glitters is  gold

FIG. 24(i)

Adage #3: not all that glitters is gold

FIG. 24(j)

APPARATUS AND METHOD FOR IMPLEMENTING VISUAL ANIMATION ILLUSTRATING RESULTS OF INTERACTIVE EDITING OPERATIONS

This is a continuation of U.S. application Ser. No. 08/377,550 filed Jan. 24, 1995, now abandoned.

RELATED APPLICATIONS

This application is related to the following co-pending U.S. patent applications, all assigned to the present assignee: Ser. No. 07/869,554, filed Apr. 15, 1992, Ser. No. 07/868,559, filed Apr. 15, 1992, Ser. No. 08/101,646, filed Aug. 4, 1993, Ser. No. 08/101,645, filed Aug. 4, 1993, Ser. No. 08/136,360, filed Aug. 4, 1993, Ser. No. 08/175,853, filed Dec. 30, 1993, Ser. No. 08/175,850, filed Dec. 30, 1993, Ser. No. 08/175,841, filed Dec. 30, 1993, Ser. No. 08/175,846, filed Dec. 30, 1993, and Ser. No. 08/176,150, filed Dec. 30, 1993. The disclosures of all of these related applications are, in their entirety, each specifically incorporated by reference herein.

1. Field of the Invention

The present invention relates to the use of animation to clearly illustrate the effects of an editing change on surrounding objects to a user and any other viewers of a display device.

2. Background of the Invention

In gesture-based graphical editing systems, the basic function is to allow the user to make arbitrarily-shaped marks by simply drawing ("inking") them in a freehand manner. Such a mark is entered as a stroke-based data object in the system. Other kinds of graphical objects can also be created in graphical editing systems, such as text characters (which can be entered by a keyboard or by handwriting recognition), geometric shapes, and images.

What makes gesture-based systems unique is that control operations can be performed on the data. In a gesture-based input system such as a pen-based notebook computer or a large scale display known as a LiveBoard (trademark of Xerox Corporation), control functions may be instituted by a command gesture. (The LiveBoard is described in a paper published in Proceedings of CHI'92, the ACM Conference on Human Factors in Computing Systems, May 3–7, 1992, Monterey, Calif.) A command gesture is a hand-drawn stroke that is created with a stylus input device and interpreted by the system as designating an action for the system to perform. The action is executed by the system upon completion of the gesture stroke by the user.

A common activity for users of gesture-based computing systems, whether whiteboard-sized or notebook-sized, is informal scribbling in handwriting and sketches, whether for purposes of communicating with others or for making notes to oneself. A great deal of such scribbling activity involves generic structures—lists, outlines, text, tables, and diagrams. To be effective, scribbling systems must support the creation and editing of these structures. Without such support, for example, the simple task of moving an item in a list can be tedious (move a segment of the list to make space for the item at the new location, move the item, close up the old space). This almost always takes too much time for users to actually perform.

Co-pending U.S. patent application Ser. No. 08/176,150, filed Dec. 30, 1993, entitled Apparatus and Method for Supporting the Implicit Structure of Freeform Lists, Outlines, Text, Tables, and Diagrams in a Gesture-Based Input System and Editing System discloses one system for supporting this kind of activity. As will be described in more detail below, data of any type may be entered in a freeform manner without any commitment to a particular structure. It is not until the editing operation is entered that a structure for the entered data is determined and the operation on that data is executed. The otherwise laborious task of moving an item in a list—which essentially consists of (1) creating space at the new location between items, (2) moving the desired item, and (3) closing up the old space to conform to a list structure—can consequently be accomplished by a single command entered into the system.

In conventional systems, edit operations are normally shown as occurring instantaneously. That is, upon execution of an edit command, the items are instantaneously shown as having moved to their new locations. While a single user, working by himself, usually anticipates the result of performing an edit operation on data because he himself has performed the operation, any observers who are also viewing the display device often fail to clearly comprehend the changes that have occurred on the display device because the changes occur so suddenly.

It would therefore be advantageous, especially for audiences viewing a display device such as the LiveBoard, to have a system that animates the actual transformation caused by the edit operation in real time in a sequence of steps from the initial state to the desired state of the editing operation. This enables a user and any others watching the display device to see the actual movements of various elements, so they all will have a clearer understanding of the manner by which the system interprets the editing commands. Also, such a system would enable students to appreciate the effects of the different operational commands, as well as enhance practice sessions on the LiveBoard.

The use of animation techniques in user interfaces is not uncommon. For example, a pseudo-animation technique is used on an Apple Macintosh computer to illustrate a window opening out of an icon when one clicks on the icon and to illustrate a window shrinking and disappearing into the icon when the window is closed. The Hypercard system on the Macintosh also provides for several different visual transitions between cards, such as sliding and fading, but no data is changed during these transitions. The only thing changed is at which card the user is looking. Similarly, in the SGI windowing system from Silicon Graphics, when a user clicks a button icon on the screen, an animation shows the button rotating and growing in size to fill up the screen before presenting a series of sub-buttons. In all these cases, no user-created data is being edited; rather, the systems' user interface objects are being transformed.

There are also computer systems whose purpose is to help users create animations. In these systems, users specify how material they create is to be animated and the systems then perform the animations specified.

Animation is also used in program animation systems to help users visualize the internal workings of computer programs by displaying each change carried out by the program. For example, if one wanted to understand how multiple processors coordinate and carry out their activities, animation can show which processors carried out which activities.

However, animation techniques have not been applied to graphical editing systems to illustrate the results of user-requested changes, both to the graphical objects being changed and to the contexts of the changed objects.

SUMMARY OF THE INVENTION

It is an object of the present invention to provide a system which portrays user-specified editing operations by animating the operations as graphical transformations of the data being edited.

The above object is achieved by an editing apparatus and method wherein an editing change to data displayed on a display device is portrayed at a visually apparent rate, in order to enable an observer to visually appreciate the effect of the change to the selected portion of the data as well as the changes to the surrounding unselected portion of the data.

In accordance with the present invention, a display-oriented graphical editing system is provided which comprises a display device, means for selecting at least a portion of displayed data, means for selecting an editing operation to be performed on selected displayed data, means for performing said editing operation on said selected displayed data, and means for animating one or more changes to said displayed data resulting from said editing operation at a visually apparent rate. The animating means comprises means for animating a prime change to said selected displayed data and means for animating contextual changes to said displayed data not selected by said selecting means, said contextual changes resulting from said prime change to said selected displayed data.

In accordance with another aspect of the invention, a method for illustrating editing changes to data on a display device is provided and comprises selecting at least a portion of displayed data, selecting an editing operation to be performed on selected displayed data, performing said editing operation on said selected displayed data, and animating one or more changes to said displayed data resulting from said editing operation at a visually apparent rate. The step of animating comprises animating a prime change to said selected displayed data and any contextual changes to said displayed data not selected by said selecting means but which result from said prime change to said selected displayed data.

In accordance with another aspect of the invention, a display-oriented graphical editing system comprises a display device, a control device for selecting at least a portion of displayed data on said display device and for selecting an editing operation to be performed on selected displayed data, and computer processing circuitry coupled to and responsive to said control device which is programmed to perform said editing operation on said selected displayed data and to animate said editing operation on said displayed data and contextual changes resulting from said editing operation at a visually apparent rate.

In accordance with another aspect of the invention, a display-oriented graphical editing system comprises a data interface surface, an interacting device for entering gestures on said data interface surface to select at least a portion of displayed data and to select an editing operation to be performed on selected displayed data, and computer processing circuitry coupled to and responsive to said interacting device which is programmed to perform said editing operation on said selected displayed data and to animate said editing operation on said displayed data and contextual changes resulting from said editing operation at a visually apparent rate.

In accordance with another aspect of the invention, a method for animating editing changes to a plurality of objects displayed on a display device of a computer comprises the steps of determining which of said plurality of objects are to be manipulated on said display device in response to an operation command by a user of said computer, determining one or more parameters for each of said changes to be animated, determining in how many iterations N an animation should occur, and performing said animation in iterations comprising, for each of said iterations, erasing each of said objects which must be manipulated and displaying each of said objects which are to be manipulated an additional 1/N of a total change set by said one or more parameters over a preceding of said iterations.

In accordance with another aspect of the invention, a method for animating editing changes to a plurality of objects on a display device of a computer comprises the steps of determining which of said plurality of objects are to be manipulated on said display device in response to an operation command by a user of said computer, determining one or more parameters for each of said changes to be animated, determining in how many iterations N an animation should occur, and performing said animation in iterations comprising, for each of said iterations, erasing each of said plurality of objects which must be manipulated and displaying each of said plurality of objects which are to be manipulated a distance further along said total change, said distance varying for a first of said iterations from said distance for a second of said iterations.

BRIEF DESCRIPTION OF THE DRAWINGS

The invention is illustrated by way of example and is not limited by the figures of the accompanying drawings in which like references denote like or corresponding parts and in which:

FIGS. 8(a)–8(m) illustrate operations and gestures on handwritten lists;

FIGS. 9(a)–9(f) illustrate operations and gestures on handwritten outlines;

FIGS. 10(a)–10(j) illustrate operations and gestures on handwritten text;

FIGS. 12(a)–12(i) illustrate operations and gestures with border lines;

FIGS. 17 and 18 illustrate alignment operations on a table;

FIGS. 19(a)–19(h) illustrate operations on and the behavior of freeform text;

FIGS. 20(a)–20(k) illustrate an animation of a move of a word (the primary objects) from one line to another, as well as the contextual moves of other objects on those lines to accommodate the change;

FIGS. 21(a)–21(k) illustrate a linear movement animation of a word within a line, as well as the contextual moves.

FIGS. 22(a)–22(k) illustrate a curved movement animation of a word within a line, which distinguishes the primary move from the contextual moves.

FIGS. 23(a)–23(d) illustrate an animation of a move in a sequential manner: first opening up a space for a word, the word moving into it, and then closing up the space where the word was.

FIGS. 24(a)–24(j) illustrate an animation of a move after the user initially drags a word to near its destination.

DESCRIPTION OF THE PREFERRED EMBODIMENT

Figure 1:
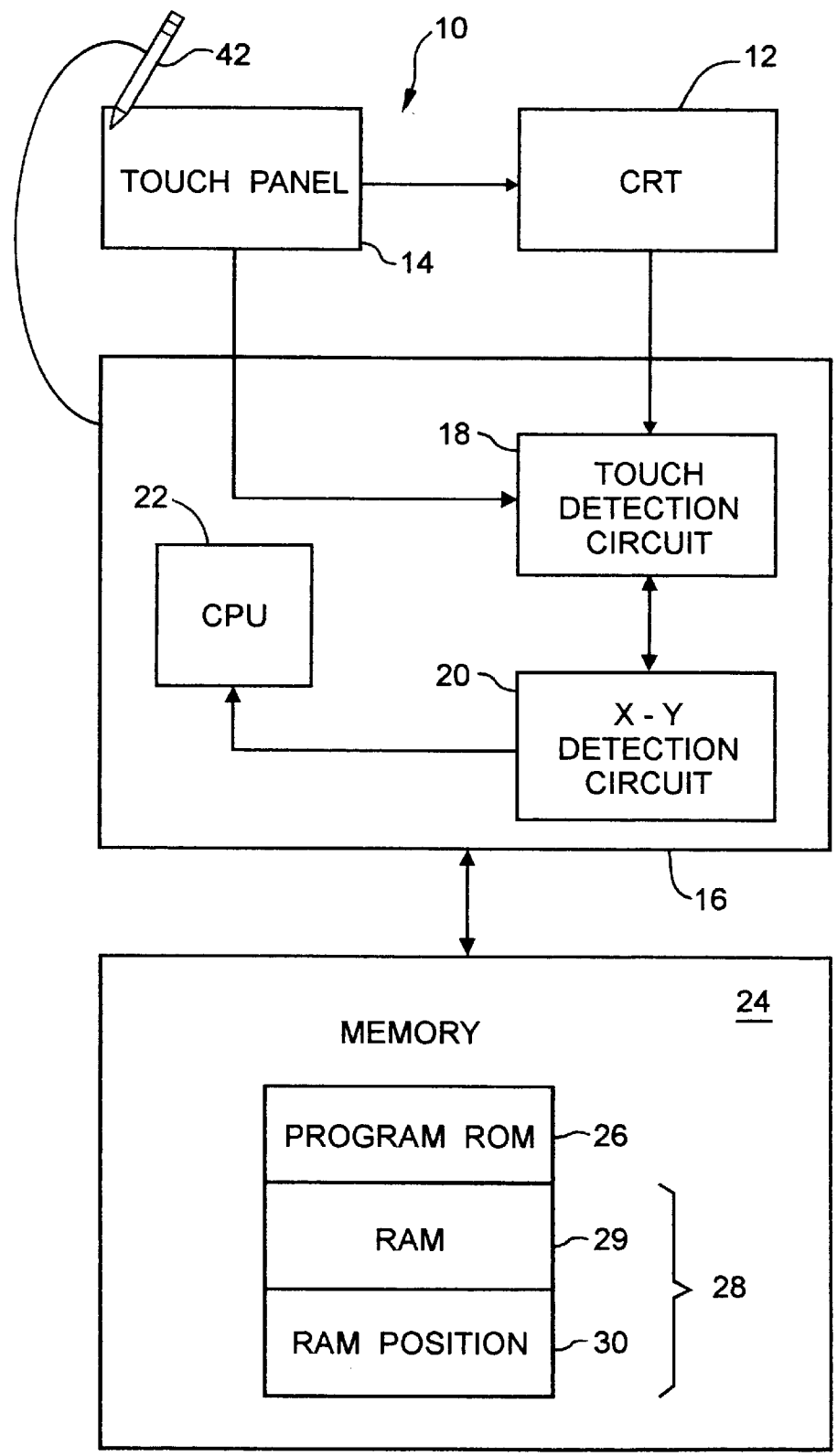
FIG. 1 is a block diagram illustrating one form of touch based input apparatus in which the system according to the present invention may be employed.

Prior to providing in Part 11 a detailed description of the invention which involves the animation of editing changes in a graphical editing system, we provide in Part I a description of a gesture-based graphical editing system with which this invention may be used. This graphical editing system is the subject of U.S. patent application Ser. No. 08/176,150.

I. A Gesture-Based Graphical Editing System

An editing system on which one may preferably practice this invention can be defined by a set of principles. Such design principles include the following:

1. The drawing area is always regarded as a plain two-dimensional surface on which the user can enter any object, in freeform, anytime. There are no restrictions on its use.

2. There are a set of gestures (i.e., strokes that are interpreted by the system) for selecting groups of strokes and operating on them. For example, a loop gesture selects some strokes and a pigtail gesture deletes them.

3. Except for the selection enclosure (defined by a selection gesture), all information on the display consists simply of strokes, which are amenable to the common stroke operations, such as coloring, thinning, moving, shrinking, erasing, etc. There are no special kinds of objects, such as bullets or cell lines.

4. There are no predefined structural groupings of the strokes by the system. But the system can, upon demand, interpret the current set of strokes as any one of several different kinds of structures.

5. By means of gestures, the user can indicate an intent to temporarily regard part or all of the current display as a particular kind of structure. For example, a left bracket gesture selects a group of strokes and regards them as an item in a list.

6. When a selection is regarded as a particular kind of structure, then any operation on that structure is performed according to the structural assumptions of that structure. For example, when a plain selection is moved, it is simply positioned in its new location; but when a list item is moved, space is created for it and the space remaining is closed.

7. When a selection of a particular type is dismissed, the structural assumptions are no longer observed and no record of the structuring is retained.

With these principles, there are no modes or predeclared structures. Structural assumptions are at the user's moment-by-moment discretion, thereby giving the user temporal flexibility.

The user also needs spatial flexibility, i.e., the ability to limit and delimit the spatial scope of what is regarded as structured. There are two more principles dealing with spatial flexibility. They are:

8. A technique is provided for putting "borders" around material on the display, which limit the spatial scope of structures. The simplest technique is to simply regard very long strokes (relative to the kind of structures being evoked) as border lines. For example, the user can limit list operations to the left side of a page by drawing a long line down the middle of the page, which will act as a border. When the user selects a list item on the left side of the page, the extent of the item will stop at the border line.

9. There may be objects on the display that do not fit into the current structure being evoked (e.g., vertical lines between columns of a table do not belong to a selected row, even though they go through the row). These are ambient objects which are left undisturbed by the structural operations.

There are a set of common, generic structures—lists, outlines, text, tables, and diagrams—that share many structural assumptions. Thus, such structures are treated together in this system in a unified design, such as using common gestures and families of similar gestures across the different structures. The structures formed using these principles are referred to as implicit S structures since only the user perceives the particular structure of objects or groups of objects displayed. Unlike in prior art systems where a user generally first defines what structure is being entered before entering strokes, the user never informs the system what structure is being operated upon. Instead, the user enters strokes and when an editing operation is to be performed the system performs a recognition routine which is programmed into the system to determine what type of structure is to be modified. Such a routine is well-known to those skilled in the art. Once, the operation is complete, the system keeps no record of the structure invoked.

Finally the system assumes that the user will invoke a particular structure only when in fact the material on the display conforms to that structure (up to some level of "noise" such as noise created by stray marks—the system ignores a certain level of "noise"). Thus, the user can invoke a table operation on a node-link diagram, and the system will carry it through without checking that it makes sense. These principles are effected in the following system description.

Referring to FIG. 1, there is shown a block diagram of the gesture-based input system 10 including a CRT display 12. A transparent pressure sensitive type drawing surface 14, i.e. touch panel, is attached onto the surface of CRT display 12. Drawing surface 14 is touched by a user and the touch is detected by touch detection circuit 18.

The detected signal from touch detection circuit 18 is input to an X-Y detection circuit 20 which processes the input signal. Thus, the X-Y detection circuit 20 detects the (x, y) coordinates of the input point touched on the surface of drawing surface 14 and transmits such information to CPU 22. Touch panel detection circuit 18, X-Y detection circuit 20 and the CPU 22 combine to form controller 16. Controller 16 performs the control in accordance with the control program stored in program ROM 26 in memory 24. ROM section in memory 24 includes program ROM 26 in which the control program of CPU 22 is stored and a pattern data area for storing various kinds of character patterns or the like. RAM section 28 of memory 24 includes a RAM portion 29 which is used as a work area of CPU 22 and a character position data area 30 to store display positions of character patterns and the like.

Figure 2:
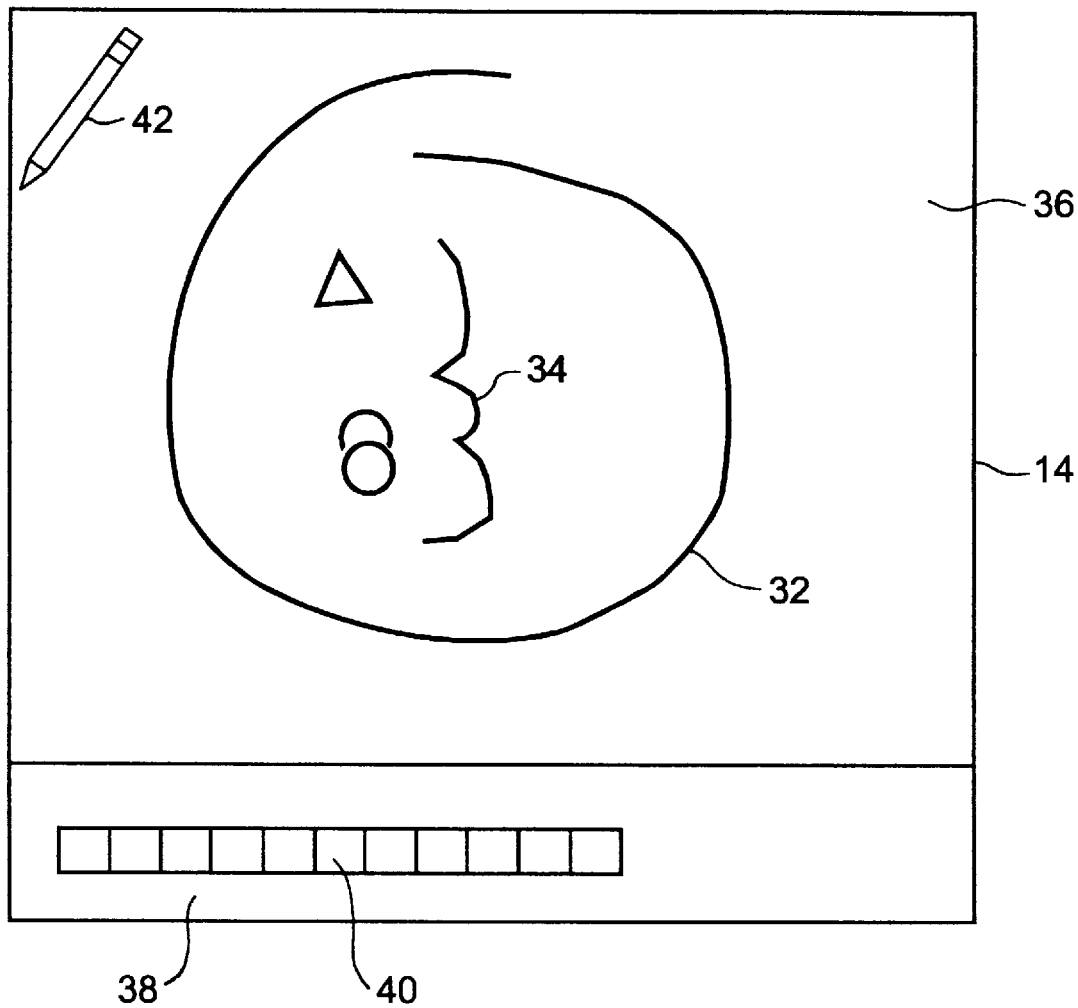
FIG. 2 is a view of a display screen with a freeform loop gesture enclosing several objects.

Specifically, in FIG. 2, drawing surface 14 is an electronic input device such as an electronic sketch pad, LiveBoard or whiteboard which employs a working surface and may employ a plurality of accessible functions 40 as is shown. The working surface is the upper area 36 of drawing surface 14 and the accessible functions 40 are positioned at the bottom area 38 of drawing surface 14. These functions 40 may include new operation (draw mode), delete, move, shrink and so on. Alternatively, these functions can be accessed by a pop-up menu. These functions however are optional in designation, their principal objects being to define operations which are inherent in the operation of the system. These functions may share some of the same functions that are represented by many designated command gestures.

A suitable user manipulable control or interacting device 42 such as a stylus or light pen is employed to draw input symbols, select functions or draw gestures representative of specified functions. Obviously, other variants within the skill of the art may be employed.

In FIG. 2 the user has created objects 34 and has selected these objects by drawing a freeform loop 32 around them.

The procedures underlying the system are best understood by first examining the process of performing a generic operation on an implicit structure. The key details of the procedures are discussed below.

Figure 3:
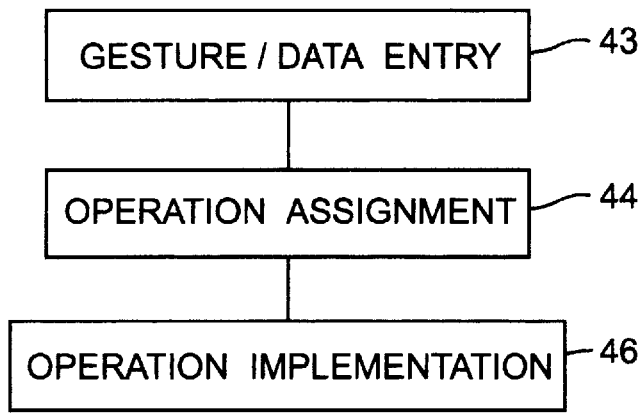
FIG. 3 illustrates a simple flowchart of the basic operations of the system shown in FIG. 1 according to the present invention.

In order to support operations on implicit structures, the system can be broadly characterized to include the following three basic features, as shown in FIG. 3.

(1) Gesture/Data Entry 43; receive data or command gestures that are drawn as a stroke on drawing surface 14, and interpret the individual stroke as a command gesture in response to some action taken by the user. Such an action may be exerting pressure on a button located near the grasping portion of the stylus 42. There are other means available to instruct the system to interpret a stroke as a command. However, for purposes described herein it is assumed that the system is able to interpret a stroke as a command gesture when the user desires.

(2) Operation Assignment 44; Once command gesture(s) is/are issued by the user, the system scans the program memory to determine the operation or operations assigned to that/those gestures, declare and determine a type of structural model in accordance with the gestures; and (3) Operation Implementation 46; means for executing or performing that operation or operations with respect to the desired data.

Figure 4:
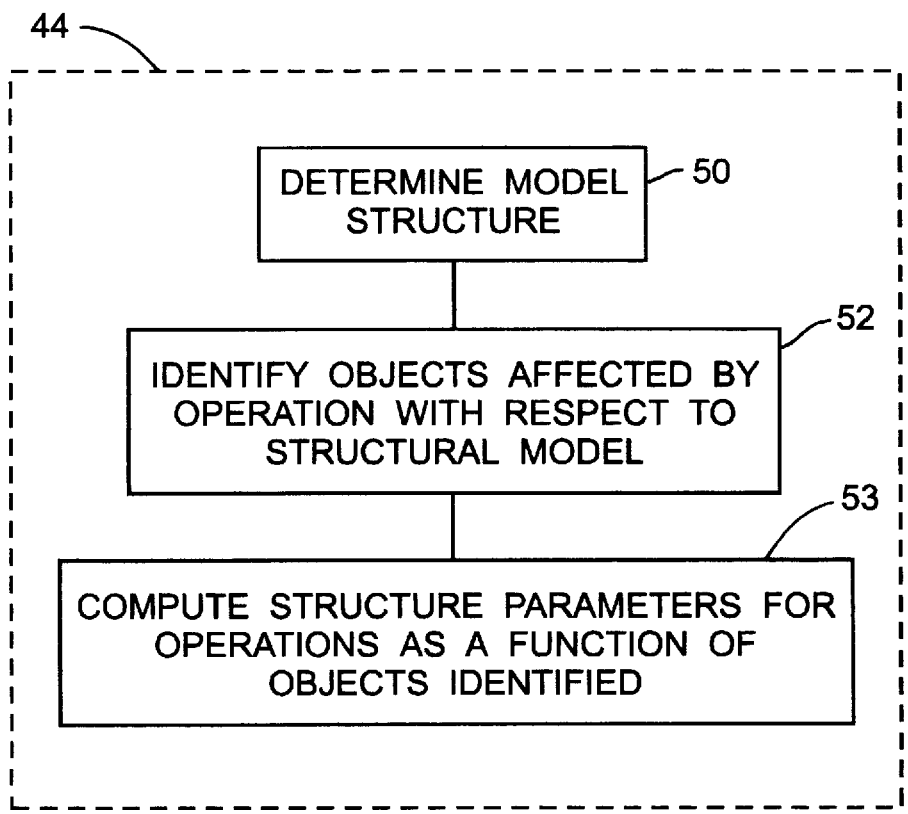
FIG. 4 illustrates an expanded flowchart of the operation assignment function shown in FIG. 3.

Feature (2) consists of the following three sub-features which are shown by blocks 50, 52, and 53 in FIG. 4.

(1) Determine structural model;

(2) Identify the local objects under the structural model that will be affected by the operation; and (3) Compute structural parameters for operation as a function of the objects identified.

At block 50 a structural model is declared and a particular model type is chosen according to the combination of gestures used to make a selection and is used to act upon the selected information.

A model structure is first called by a gesture used to define an operation. That is, a specified gesture for selecting desired information on the display alerts the system that such information shall be treated within a basic structural model context. These specified selection gestures create the structured, i.e., rectangular enclosures 60 shown in FIG. 5.

The structured enclosures 60 also enclose and thereby identify the data which will be affected by the operation 52.

In the preferred embodiment, the structured enclosures are created by drawing brackets gestures (up and down brackets 61 and 62 and left and right brackets 63 and 64), an underline gesture 75 or "L" shaped gestures 65. These selection gestures are collectively known as structured selection gestures. The recognition techniques for these gestures are quite simple, because of the easily distinguishable features of such gestures, such as corners and orientation.

After the structured selection gesture is drawn, the system creates the structured enclosure by a concept known as projection, subject matter disclosed in U.S. patent application Ser. No. 08/175,841, filed Dec. 30, 1993, entitled Apparatus and Method for Altering Enclosure Selections in a Gesture Based Input System described above. With structured selection gestures, the segments (legs portion) of the gesture are partially projected to some predetermined border. These projected segments are called extensions. All of the data falling within the area defined by the projected boundaries are selected. For example, the ends of a left bracket gesture "[" are projected horizontally to the right until some predetermined border is reached to terminate the projection. All of the data falling within the extension boundaries of the projected bracket gesture are selected. The L-shaped gesture works in a similar manner. In the case of the underline gesture 75, the system identifies the "line" of text above or touching the underline, and selects the objects on the line that lies between the endpoints of the gesture.

On the other hand, a selection made by freeform loop 56 however is merely a selection of items for future operation having no regard for specifying and/or organizing such information according to any structural model. In order to move the selection made, the user may use the (unstructured) move gesture 68.

Figure 5:
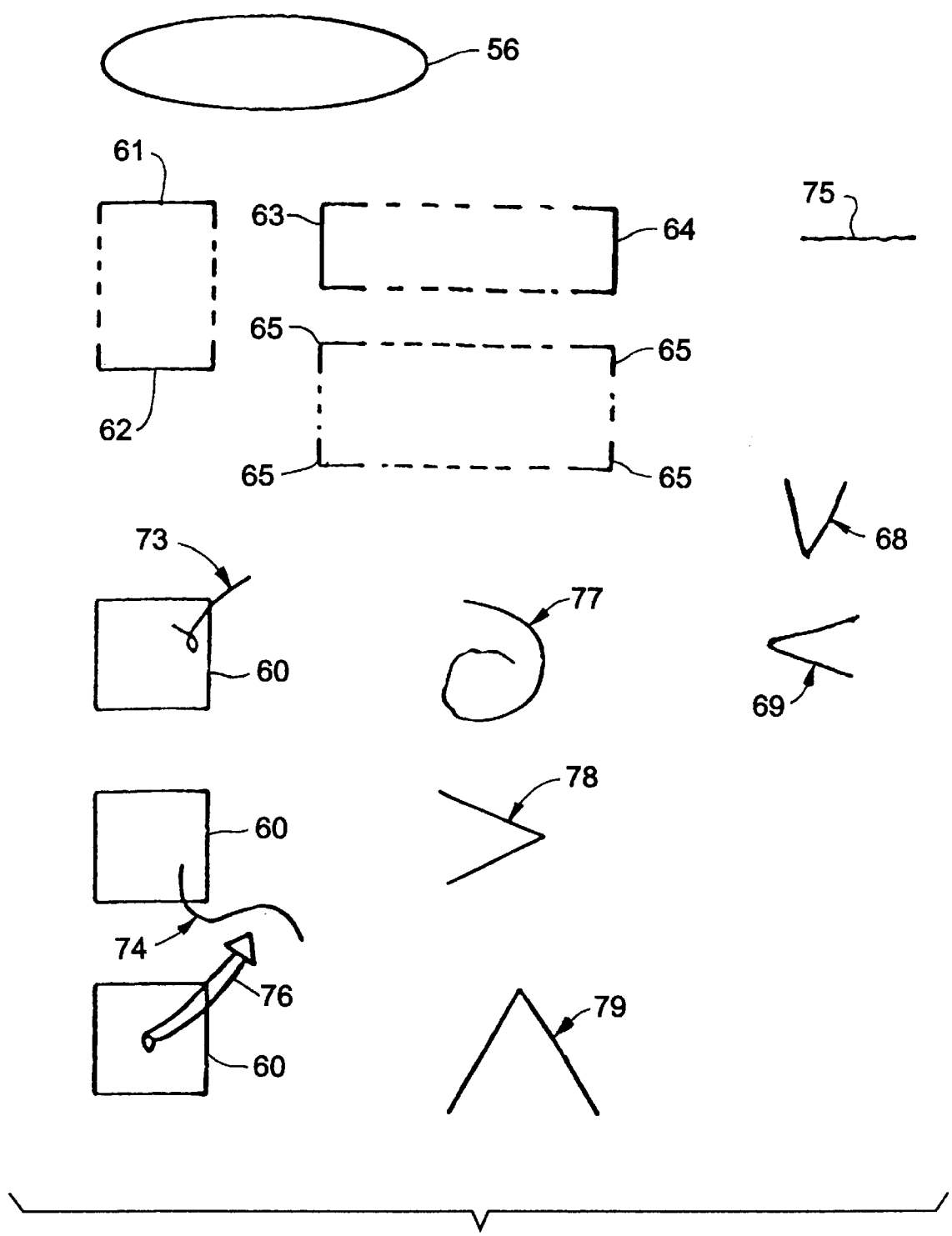
FIG. 5 illustrates the gestures employed in a system incorporating the present invention.

In most situations the model type, i.e., the precise structure of the information is not determined until the user executes a second command on that selection of items, i.e., draws a second gesture. Examples of these gestures are also shown in FIG. 5. Such gestures may include delete 73, move 74, shrink 77, copy 69, and drag (dynamically, viz., where cursor "sticks" to and moves with the stylus or other control or interacting device) 76. This list however is not limited. The details of the specific models, their operations and these and additional gestures are described below. Some command gestures, in particular the wedge 78 and caret 79, can also be employed without a preceding selection gesture. In another embodiment, however, the first gesture (and sometimes the second) indicates the model and selects some set of strokes within the model, then a second gesture specifies the action to be performed on the selected strokes.

At block 52 (FIG. 4) the system identifies the local objects that will be affected by the operation with respect to the structural model. The system at this point operates by grouping strokes into structures (e.g., line items, which are rows of objects) and partitioning a set of strokes relative to those structures. For example, to move a line item, the system must identify what strokes belong to the line item, identify the line items at the destination to which the line item will be moved, (to determine the "inter-line gap"), and partition the remaining strokes on the screen according to whether they are above or below the source line, i.e. where the line item was originally, and above or below the "destination gap"- explained below. From this partitioning, line spaces are easily derived. The line grouping technique is further described below.

In the case of column structures, procedures analogous to those for lines are used to group strokes into columns, find column gaps, and partition strokes left and right of columns. For the text model, however, there is a set of procedures to partition strokes within a line into those that are to the left and to the right of the selection or of the destination of a move. Note that there is no need for a word grouping procedure because the user has already grouped words explicitly by the bracket gestures. In order to move a group of words, the system need only to perform line grouping at the source and destination, so that it can move the left and right line subsegments apart at the destination and back together at the source. Where only a partial group selection is made, the system can make certain assumptions to complete the grouping. For example, an underline gesture will require the system to find the line boundaries.

In all cases, ambient strokes, which are left undisturbed by structural operations, and border strokes are identified by looking for objects that are very large relative to the selected structures.

At block 53, the system computes the structural model parameters for the operation as a function of the local objects identified above. The required procedures include computing baselines, line and column spacing, and word spacing. There are also special algorithms, such as those for computing the parameters for collapsing subtrees in an outline structure.

In sum, the system has determined the structural model, the affected objects, and the structural model parameters. The final function is to implement the operation 46 (FIG. 3), i.e., execute the desired operation which involves straightforward manipulation of the objects on drawing surface 14. For example, to move a line to a location higher on the page, the lines between the source and destination are moved downward, and the line is moved up into the resulting space, and the vacated line space is removed.

The key procedures or steps are those that find the implicit structures. A typical procedure is the one for grouping lines. A related procedure determines baselines. (As used herein, a baseline is a line on which the bottom of all characters except for descenders, such as the left leg of the letter "p", lie.) Fundamental to both of these procedures is determining the density of the "ink" in the horizontal cross-sections of the screen. A top-down description of these procedures is provided below and pertinent portions of these procedures are set forth in Appendix A.

Given a point, say the endpoint of a move gesture or the top point of a caret gesture (to open a word space), the Line Grouping procedure finds the strokes that belong to the line of objects containing the y-coordinate of the given point. The procedure computes the top and bottom boundaries of the line and then tests all the strokes on the screen, collecting those that "reside" on the line. The criterion for a stroke residing on a line is that more than half of the vertical extent of the stroke must lie between the top and bottom line boundaries. The procedure FindLineBoundaries in Appendix A is based on the ink density function.

This density is represented discretely by an array. The screen is partitioned into horizontal strips and the "density of the ink" is computed for each strip. This array of values is then converted to binary values (0 or 1) by applying a threshold of ink density in order to achieve the value "1". The threshold is expressed as a fraction of the average density. By employing smaller or larger thresholds, the ink density can be used to find line boundaries or text baselines. Other, more sophisticated procedures could also be used to determine line boundaries(e.g., steps that can deal with skewed lines).

Figure 6:
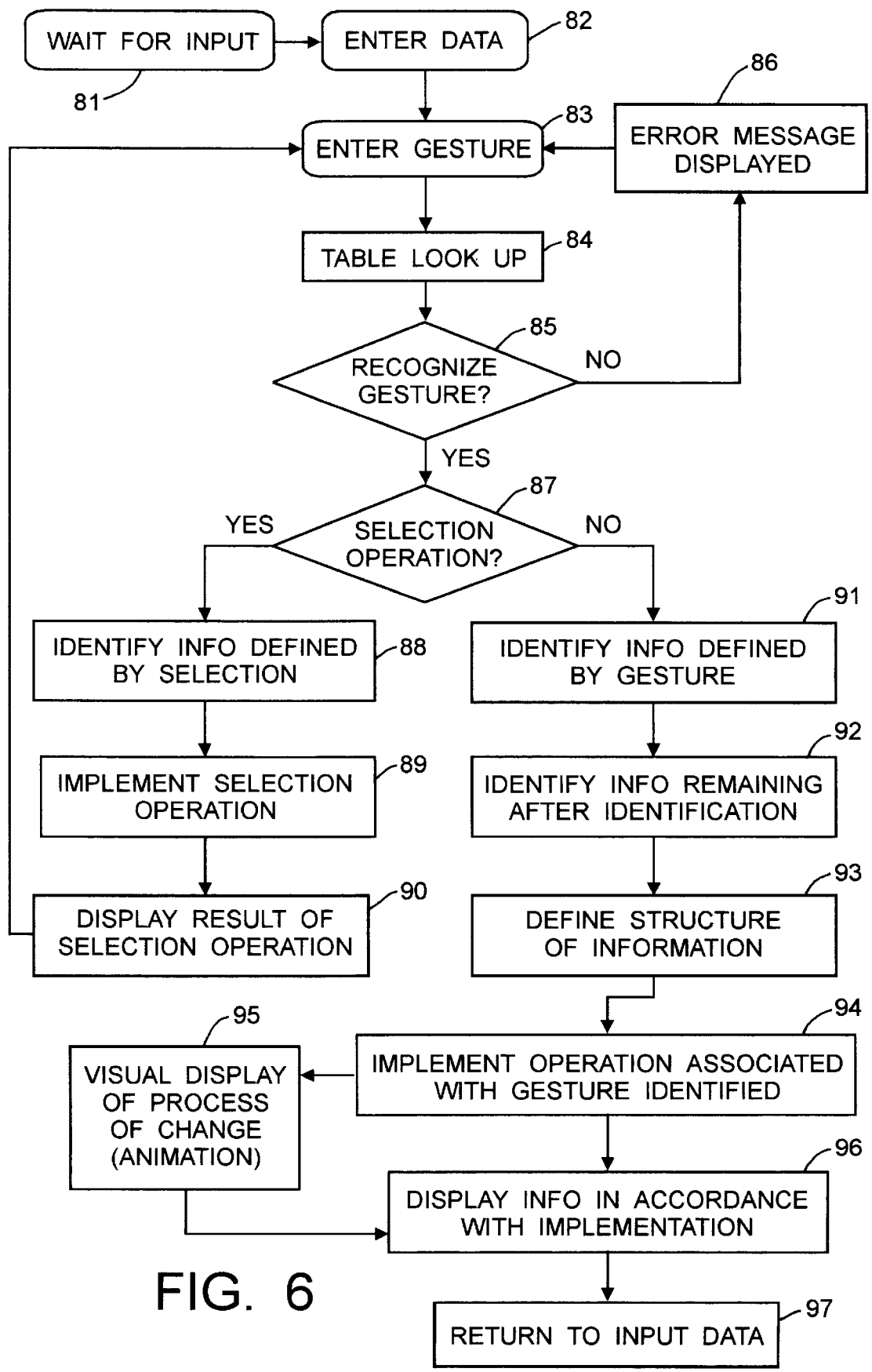
FIG. 6 illustrates a flowchart of the basic control operations of the system which supports implicit structures according to the present invention.

FIG. 6 is a flowchart of the basic control operations which implement the system procedures described above. At block 8 1, the system is inactive until the user enters data 82 by any of the means described above (stylus, scanning, typed entry, etc.). Once data is entered into the system, the user may draw a gesture on the drawing surface 14 at user action FIG. 83. At block 84, the system then detects that a gesture is entered and performs an analysis on the shape of the gesture to categorize it as one of the gestures known to the system. At decision diamond 85, if the gesture is not recognized by the system, an error message is displayed at block 86 and the system returns to user action FIG. 83 for a new gesture entry. If the gesture is recognized, then the system determines whether the gesture is one for selecting desired data. At this point it is noted that the system also determines the type of selection gesture because the type of selection gesture determines whether the system performs a standard data operation or data operation within a structural context. The details of the type of selection gestures and their attributes however are discussed below with respect to the flowchart in FIG. 7.

If the gesture is a command for selection then the system will identify the data defined by the selection at block 88, implement the operation of selection at block 89 and display the result of the implemented operation at block 90. The system then returns to user action FIG. 83 where the user may enter another gesture.

After the user operates on a structural selection (e.g., moves it), the structural selection remains for further operations. The user can revert to freeform mode by simply beginning to draw strokes, and the objects are no longer selected.

If a gesture other than a selection gesture is detected, then the system will identify the information defined by the gesture at block 91, identify the remaining information data after the identification at block 92, and define the structural model for the information based on the gesture and previous information identified. A structural model may be a list, table, diagram, or outline. For example, a list is characterized as a column of line items (each item consisting of a row of graphic objects), and when an item is moved then the column is rearranged to create space for the item and close the space remaining after the move. At block 94, the system implements the operation associated with the gesture identified (move, shrink, delete, etc.). The system then displays the process of the change of information in accordance with the operation at block 95 (viz. animation, described in more detail below). The system also displays the result of the information in accordance with the implementation at block 96. The system then returns to FIG. 81 where the system waits for input.

Figure 7:
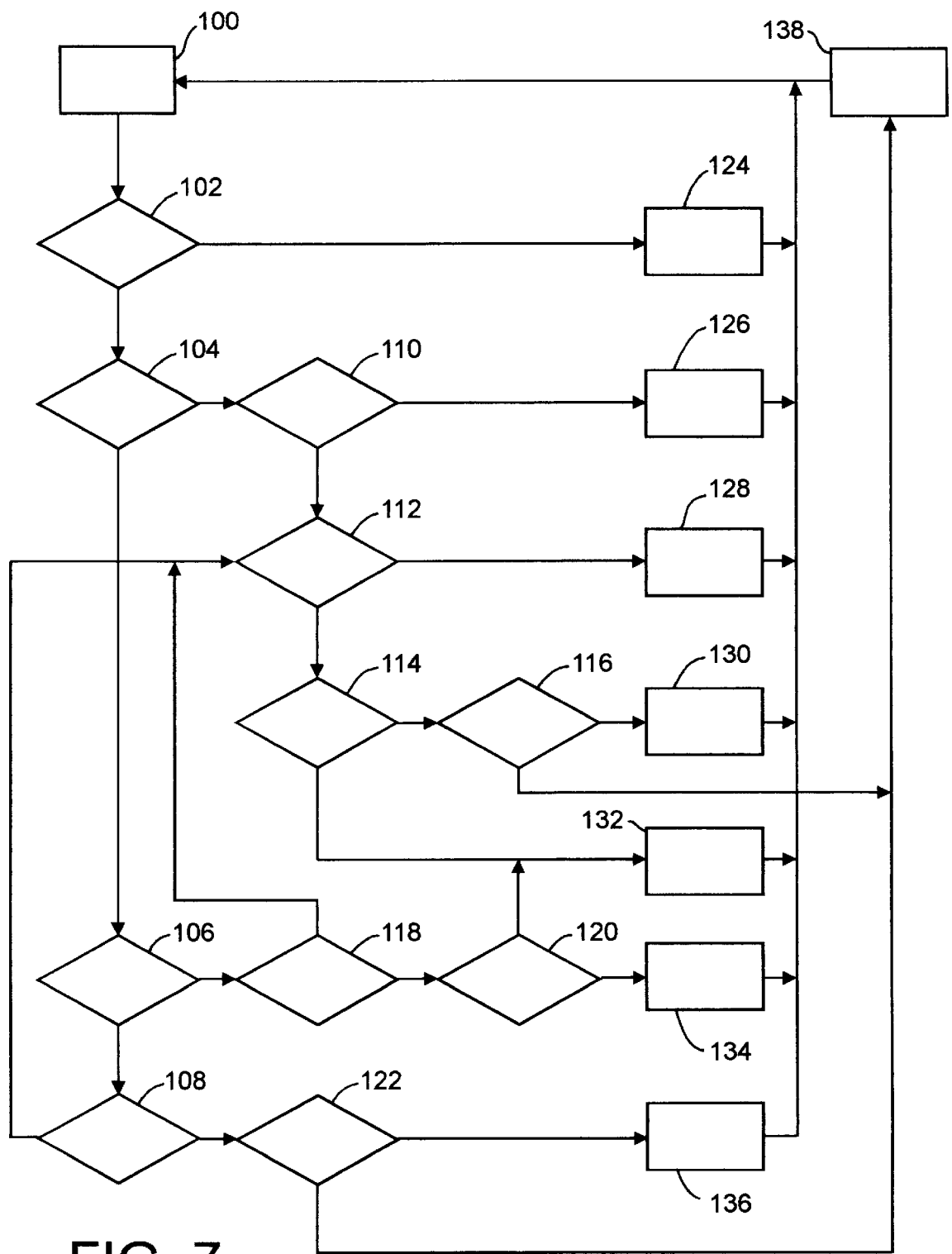
FIG. 7 illustrates an expanded flowchart of the operations shown in FIG. 6.

The operations of the flowchart illustrated in FIG. 6 and the description thereof are shown in an equivalent form in the flowchart shown in FIG. 7. The text for each element in the flowchart FIG. 7 and the corresponding reference numeral are set forth below.

100 Wait for user input; the system is inactive at this step.

102 Is input a gesture?; Once the user enters information, the system determines if the information is a gesture. If information is not a gesture then the system moves to block 124 and performs other operations. Otherwise the system advances to decision diamond 104.

104 Does freeform selection enclosure already exist?; If a freeform selection enclosure exists then the system advances to block 110. Otherwise if no freeform selection exists then the system moves to decision diamond 106.

106 Does a structured selection enclosure already exist?; If structured selection enclosure exists then the system advances to decision diamond 118. If no structured selection exists the system moves to decision diamond 108.

108 Is input a selection gesture?; If the input information is a selection gesture then the system advances to decision diamond 112. If it is not a selection gesture, the system advances to decision diamond 122 then system signals that such input is an uninterpretable gesture 138.

110 Is input a freeform alteration gesture?; If the input information is a freeform alteration gesture then the system advances to block 126 and alters the existing freeform selection gesture. If it is not a freeform alteration gesture then the system advances to decision diamond 112.

112 Is input a freeform selection gesture?; If information is a freeform selection gesture then the system advances to block 128 and creates a new freeform loop and returns to block 100. If the input is not a freeform selection gesture then the system moves to decision diamond 1 14.

114 Is input a structured selection gesture?; If input is a structured selection gesture (as described above) then the system moves to block 132 and creates a new structured selection. (A structured selection gesture encloses information to be regarded according to one of the structural models. These gestures include brackets and L-shaped figures. Details of these gestures are described below.) If the input is not a structured selection gesture then the system moves to decision diamond 116.

116 Is input an operation-on-selection gesture?; If input is an operation on a freeform selection gesture then the system advances to block 130 and performs the operation. If it is not then the system causes an error signal to appear indicating a uninterpretable gesture 138.

118 Is input a structured selection gesture?; Here a structured selection already exists. So, if the input is a structured selection gesture then the system moves to decision diamond 120 and determines whether the structured selection "matches" the existing selection gesture. The term "matching" is described below. If the input is not a structured selection gesture then the system returns to decision diamond 112 and determines if the input is a freeform selection.

120 Does structured selection gesture "match" existing structured selection?; If the input structured selection matches the existing structured gesture then the system advances to block 134 and alters the existing selection gesture. Otherwise the system advances to block 132 and creates a new structured selection and removes the pre-existing selection enclosure. "Match" means that the material selected by the new gesture overlaps the existing structured selection in a way appropriate to the type of the selection. For example, if the area defined by a projected selection gesture intersects the area of an existing rectangular selection, the selections "match", and the existing selection will be extended or contracted so that the projected selection gesture becomes one of its boundaries. However, strict intersection may not be necessary. For example, if the existing structured selection fits the "wrap around text" model (text which continues from line to line), then the gesture would be interpreted as marking a point in the line-to-line flow.

122 Is input an operation-without-selection gesture?; If the input is a gesture that acts without a selection gesture then the system advances to block 136 and performs the operation. Otherwise an error message will appear indicating an uninterpretable gesture has been entered.

124 Perform other operations; self defining.

126 Alter existing freeform selection; self defining.

128 Create a new freeform selection; self defining.

130 Perform operation on existing selection, self defining.

132 Create a new structured selection; self defining.

134 Alter existing structured selection; The existing structured selection enclosure is reshaped to include the alteration gesture.

136 Perform operation; self defining.

138 Signal uninterpretable gesture to user; self defining.

I. Details of the Implicit Structures Supported

1. Handwritten Lists

A. Structural Model:

A list is assumed to be a vertical column of line items (or just items for short) separated by line spaces. An item is a row of objects and usually is a line of text. It is therefore assumed to be wide and not very tall. Thus since a left-sided bracket at the left of an item is an efficient way to select text, this gesture is the preferred form of selection in this model. In a list the vertical space between items is minimized. When an item is deleted, the remaining space is removed, (i.e., the items below it are moved up). Items however cannot lie on top of one another. Consequently, when a line item is moved between two other items, space is created for the new item. List operations attempt to keep the current line spacing locally intact. But line spacing can be explicitly opened up or closed up. Also, an item may be shifted horizontally to achieve appropriate alignment with other items.

B. Operations and Gestures

Figures 8A, 8B, 8C, 8D, 8E, 8F, 8G, 8H:
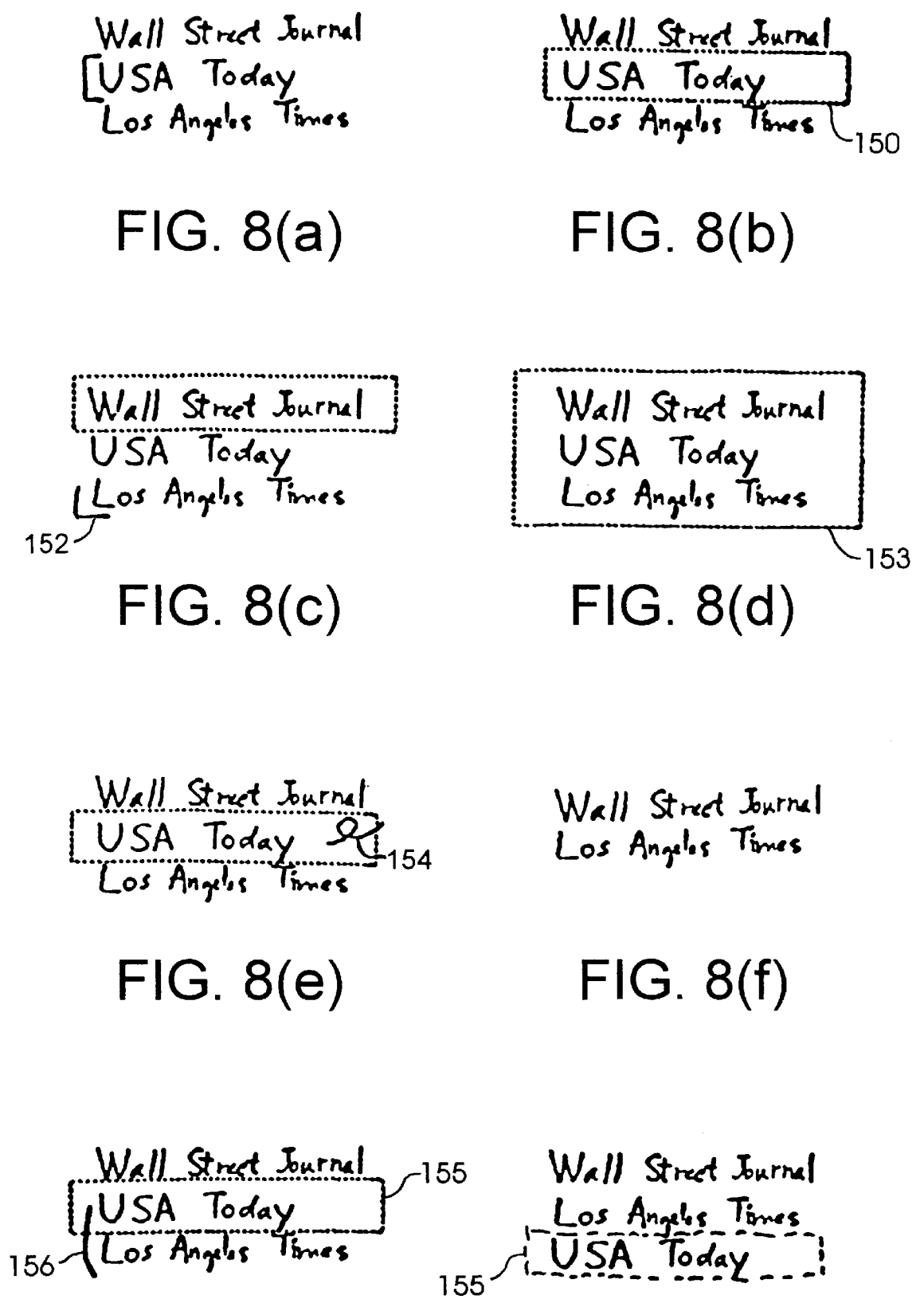

As discussed above, a "[" gesture is chosen as the structured gesture and is drawn to select an item or line of items. The height of the "[" defines what is considered to be included in the item. Note however that multiple lines can be included within a gesture. FIGS. 8(*a*) and 8(*b*) illustrate a list of newspapers. In FIG. 8(*a*) a left bracket is positioned to the left of "USA Today" to select that entire item. FIG. 8(*b*) shows the rectangular selection enclosure 150 automatically constructed around the entire item. To expand (or contract) the selection to include (or exclude) line items, an "L" shape gesture 152 is drawn which indicates how the selection figure should be reshaped. Thus, the rectangular selection is reshaped to include the L-shaped gesture and therefore include "USA Today" and "Los Angeles Times." This gesture 152 is shown in FIG. 8(*c*) and the resulting expanded selection enclosure 153 is shown in FIG. 8(*d*).

If a user wishes to delete the selected item, then he/she may draw a pigtail gesture anywhere within the selection enclosure. FIG. 8(*e*) shows this gesture 154. Once the delete gesture is issued, the item is deleted and the remaining two items are moved closer to one another to remove the empty space between such items. FIG. 8(*f*) shows the remaining two items in the list.

To move the selected item to another position in the list, a user may draw a line gesture 156 from the selection enclosure 155 to a target position, e.g., the location just beneath the item "Los Angeles Times" in FIG. 8(*g*). The resulting move is shown in FIG. 8(*h*). Alternatively, the user may move a selection enclosure to the target position by drawing a ">" gesture at the target position (not shown).

In order to shift the selected item horizontally, a user may draw a horizontal line gesture. In order to copy the selected item to another position in the list, the user may draw a "<" gesture at the target position. In order to shrink/expand the selected item, a user may draw an inward/outward spiral gesture 77 as shown in FIG. 5.

To quickly make space for new line item when there is no selection, a wedge ">" gesture may be drawn in the space between lines. An example of this gesture is shown in FIG. 8(*i*). A wedge 158 is positioned between "USA Today" and "Los Angeles Times." FIG. 8(*j*) shows a space inserted between these items.

In order to drag a selected object, the user touches the very center of the selection region. Once the user touches the center, the selection "sticks" to the pen and the pen slides the image of the selection around until the pen is lifted, at which time space is opened and closed as appropriate and the selected item moves into its proper position. An example of the drag operation is shown in FIGS. 8(k), 8(l), and 8(m).

In FIG. 8(k), "Wall Street Journal" is selected. FIG. 8(l) shows that after dragging this item, it is positioned between "USA Today" and "Los Angeles Times" and positioned to overlap these two items. FIG. 8(m) shows the list as it has been straightened out by the computer in the order "USA Today", "Wall Street Journal" and "Los Angeles Times". It is important to note that the arrow 76 in FIG. 5 represents the motion of the drag operation. However no arrow is actually drawn on the screen for this operation. It is only shown in FIG. 5 as one operation available to the user.

Other user actions can be used to apply operations that do not depend on the structured nature of the selection. For example, to change the strokes to red, touch the make-red button.

2. Handwritten Outlines

A. Structural Model

An outline structure is an extension of the simple list structure. Line items have indentation levels, which determine the hierarchical structure of the items. There are no fixed "tab" positions; the indentation level of an item is determined by whether the horizontal position of the leftmost stroke is "close to" or "significantly" different from the horizontal position of the leftmost stroke of the item above it. There is an alignment operation that shifts items, i.e., aligns the edge of the stroke of each item closest to the left either exactly the same as or significantly different from their preceding items. This operation shows the system's interpretation of the indentation structure.

The user can shift the items to adjust the indentation levels. An outline subtree is the combination of an item and all items below it that have greater indentation levels. Subtrees can be collapsed to show the higher level structure of an outline. Collapsed subtrees are physically shrunk (in the vertical dimension only) so that they appear as thin physical lines, termed container objects, underneath the topmost items in the subtrees. Container objects can be expanded back to their original size. To indicate the presence of the container object, an icon is employed, such as a thickened line, or the like. Only a proper subtree can be collapsed. If a selection is not a proper subtree, it will be extended before collapsing. If the selection is an improper set of items that cannot be extended to a proper subtree, then the collapse operation will be aborted. The container object is treated like a list item, i.e., it can be moved as a block, and otherwise manipulated as desired.

B. Operations and Gestures

In order to horizontally align the line items in the selection, the user may draw a vertical line at the left edge of the selection. An example of this is shown in FIG. 9(a). Notice the first level heading is "Newspapers" and "New York" is the heading of a subtree. A vertical line gesture 160 is drawn at the left edge of the selected items beginning at "New York". The system compares the indentation of all the line items in the selection, and adjusts the horizontal position of the line items so that lines that were indented by roughly equal amounts are in fact indented exactly equally. The resulting outline is shown in FIG. 9(b).

To collapse one level of the selected subtree (i.e., collapse only the lowest level in the subtree), choose the collapse-one-level item from a menu. FIGS. 9(c) illustrates the selected items in the outline before the lowest level in the subtree is collapsed and FIG. 9(d) illustrates the outline after that level has been collapsed. Notice that once the lowest level of the subtree has collapsed, the other items not selected, i.e., "Radio Stations" has moved upwards to close the remaining space left from the subtree.

To collapse all levels in the selected subtree (i.e., leave only the topmost level), the user may choose the collapse-all-levels menu item. To expand the collapsed items in the selection by one level (i.e., expand only the highest level of collapsed items), the user may choose the expand-one-level menu item.

Figure 9E:
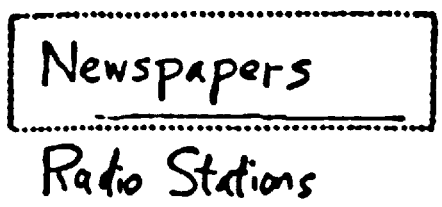
Figure 9F:
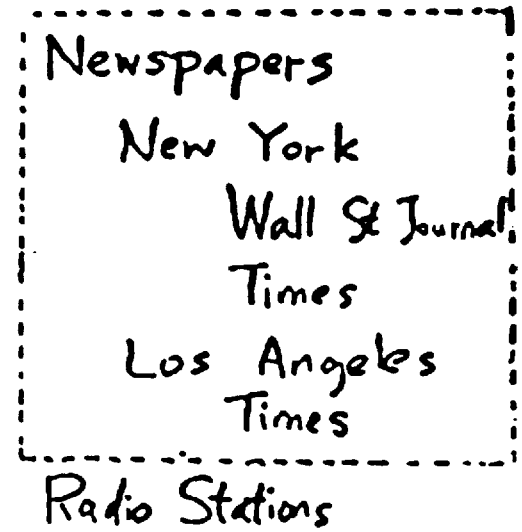

To fully expand the collapsed items in the selection, choose the expand-all-levels menu item. This is shown in FIGS. 9(e)(before expansion) and 9(f)(after expansion).

3. Handwritten Text

A. Structural Model

Handwritten "text" is a limited model of text within the context of lists and outlines. Strokes of handwriting are first assumed to be grouped as line items and then, within line items, as words separated by word spaces. The term "word" as used in this document refers not to the word of ordinary language, but merely to a horizontal cluster of objects separated by empty space. A sequence of typewritten characters delimited by spaces is a special case of such a "word". Words and word spaces on a line are treated in the horizontal dimension in a way analogous to that of line items and line spaces in the vertical dimension. Word spacing is closed up when words are deleted and opened up to make room for inserted words. Words are contained on a single line and have to be explicitly moved between lines by the user. Contiguous words on the same line can be selected with left and right bracket gestures, or by an underline gesture. When words are moved, the system distinguishes whether a word space or a line space has to be created, i.e., opened up to accommodate them. A line item is also treated this way. That is, a line item just happens to contain all the words on a line.

B. Operations and Gestures

Figures 10A, 10B, 10C, 10D, 10E, 10F:
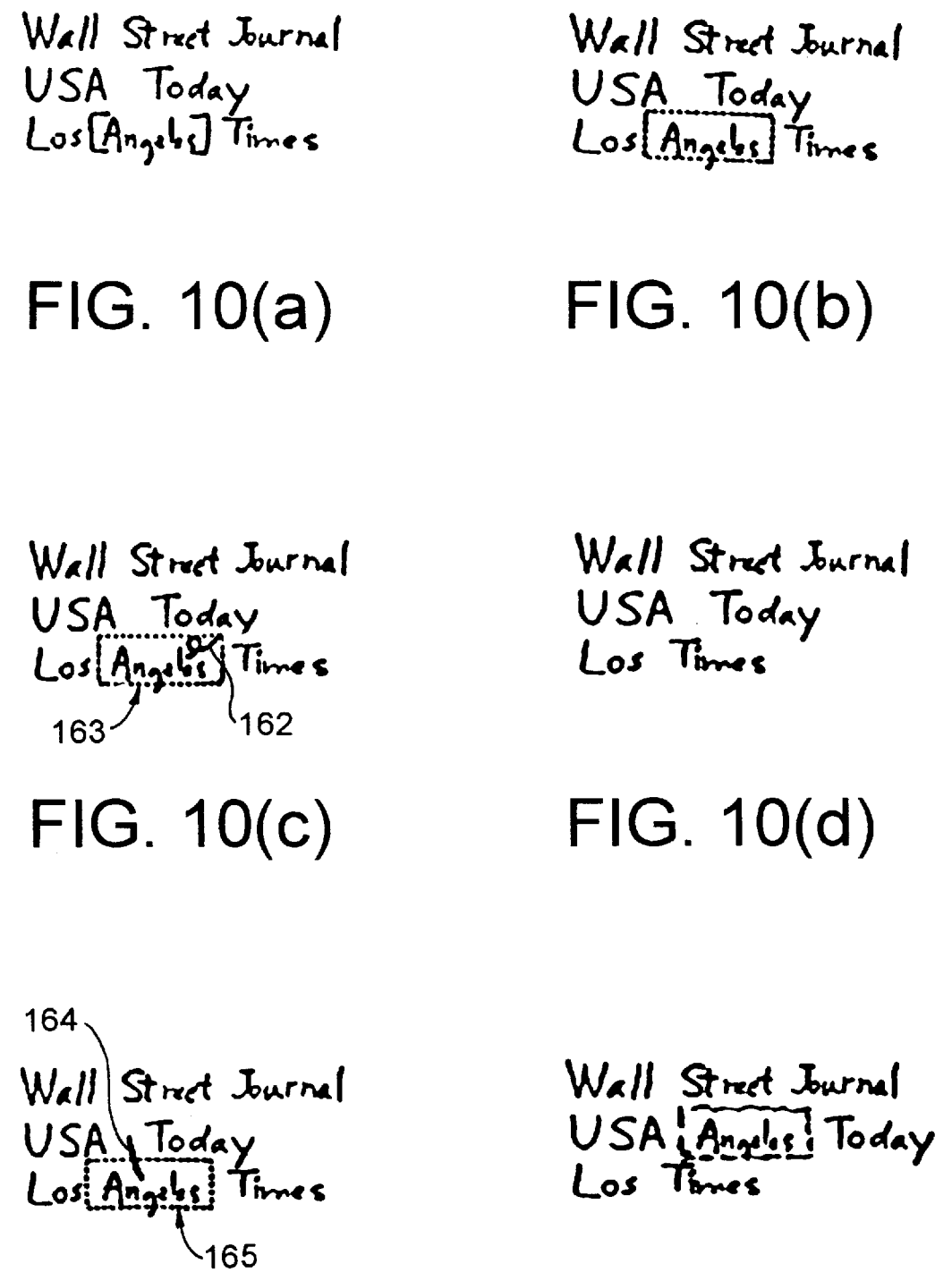

To select words on a line, a user may underline the words or draw bracket "[" and "]" gestures. (Only one bracket is needed if the words to be selected extend to either the left end or the right end of the line.) An example of this is shown in FIGS. 10(a) and 10(b). The word "Angeles" is bracketed for selection. As shown in FIG. 10(c), a user may draw a pigtail gesture 162 from the enclosure 163 to delete the item selected. The result is shown in FIG. 10(d).

To move the selected words to another place on the current line or to a place on another line, a user may draw a line gesture to a word space, or make a caret gesture "^" in a word space. An example of this is shown in FIGS. 10(e) and 10(f) where the selected word is "Angeles" and the line gesture 164 extends from the selection enclosure 165 to the desired location between "USA" and "Today." The system creates space at the desired location to fit the selected information.

To move the selected words to a new line, the user may draw a line gesture to a line space or make a ">" gesture in a line space. This is shown in FIG. 10(g). The line gesture 166 extends from the selected information, i.e., "Angeles" to a location between the first two lines of text. The system creates space between these lines of text and moves the selected information. FIG. 10(h) shows the result of these operations.

To copy the selected words to a new line, a "<" gesture may be drawn in a line space. To quickly open up space to insert text, a caret gesture may be inserted. The caret gesture 168 is shown in FIG. 10(i). Notice in FIG. 10(j) that space is created between "USA" and "Today." The system creates a fixed amount of space determined as a function of size of the neighboring text.

It is important to note that normal operations can be applied to the selected words. For example, to change the strokes to red, touch the make-red button.

4. Handwritten Tables

A. Structural Model

A table is a two-dimensional structure, consisting of rows and columns. A row is exactly a line item from the list model. A column is like a row, but with gestures and operations transposed from the horizontal to the vertical dimension. For example, a top bracket selects a column just as a left bracket selects a row; columns can be moved horizontally just as rows can be moved vertically. A column space is the vertical space between columns. There is also vertical text (like Japanese or Chinese writing), which is selected with a top and bottom bracket; the material in a column opens and closes vertically when vertical text is moved. In addition to pure row or column operations, a user is permitted to select a block of material—a rectangular selection of material from more than one row or column, again using left and right or top and bottom brackets. This provides a convenient way to apply simple commands (e.g. make red) to larger portions of a table. However, no special tabular interpretation is placed on a block selection.

B. Operations and Gestures

Figures 11A, 11B:
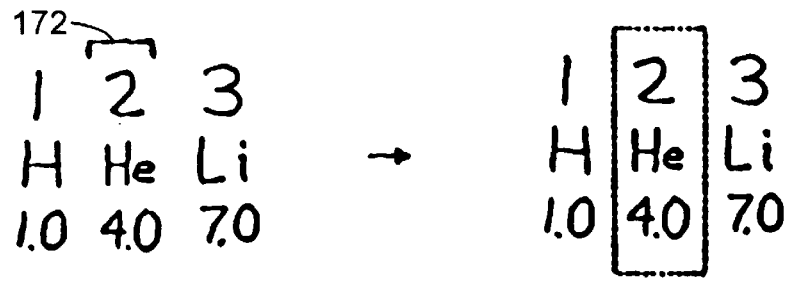
FIGS. 11(a)–11(h) illustrate operations and gestures on handwritten tables.
Figures 11C, 11D:
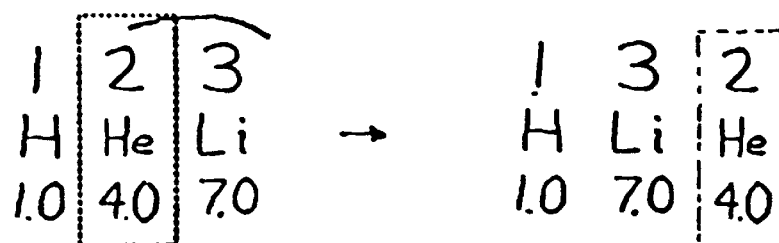

To select a column or columns, a top bracket gesture 172 can be drawn as shown in FIG. 11(a). FIG. 11(b) shows the result of the action taken in response to this gesture. To delete a selected column, a pigtail gesture can be drawn (not shown). To move a selected column, a line gesture can be drawn to the new location as shown in FIG. 11(c) (or make a "^" gesture). In FIG. 11(d), notice the entire center column is moved to the right after the column starting with "3." To copy a selected column, a "<" gesture can be drawn at the new location.

Figures 11E, 11F:
Figures 11G, 11H:
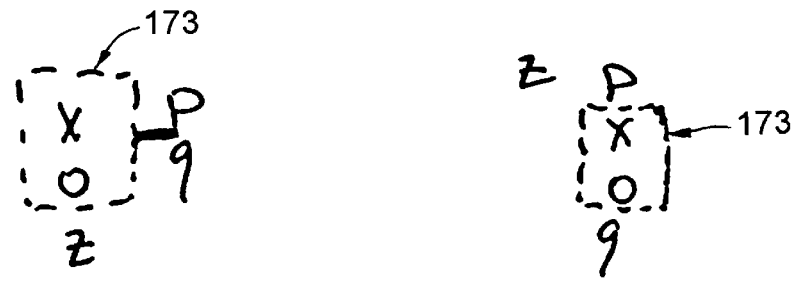

To select a vertical block, top and bottom bracket gestures can be drawn to enclose desired information. This is shown in FIGS. 11(e) and 11(f). Alternatively, a block can be selected with L-shaped gestures 65 (FIG. 5). To delete a selected block (vertical or horizontal), a pigtail gesture can be drawn from a selection enclosure. This will automatically close up the space (vertically or horizontally). To move a selected block (vertically or horizontally), a line gesture may be drawn from a selection enclosure to the target location. An example showing a move of vertical block 173 with a line gesture is shown in FIG. 11(g) and the corresponding vertical block 173 is shown after the move in FIG. 11(h). To copy a block, a "<" gesture can be drawn at the target location.

Finally, the normal operations can be applied to the selected row, column, or block in the normal manner. For example, to change the strokes in a block to red, touch the make-red buttons.

5. Border Lines

To spatially limit the scope of any structure, the user can simply draw long strokes to act as border lines. The function of borders is to limit the spatial extent of structural selections and the effects of structural operations. The system regards as a border line any long stroke that it "bumps into" while interpreting a gesture. The extent of a selected structure will automatically be stopped at a border. For example, when selecting an item in a list by a bracket as shown in FIG. 12(a), only those strokes up to the border 175 are included in the selection in FIG. 12(b). Any structural operation that would cause a violation of a border is aborted. For example, the open-up space operation (using a wedge) shown between "USA Today" and "LA Times" in FIG. 12(c) would be aborted because the space would cause the last line of the list, i.e., "LA Times" to go through the bottom border.

However, an operation may take place across a border. For example, as shown in FIG. 12(d), an item (USA Today) may be moved from one column to another in a multi-column list (with borders between the columns). Notice that in FIG. 12(e) space was created in the column on the other side of the boundary between "Paper" and "Radio" for the item "USA Today."

To make a selection extend through a border, a corner-shaped gesture or a bracket gesture may be drawn to show where to extend the selection. This is shown in FIGS. 12(f) and 12(g). Notice that the original selection enclosure is extended to include information through two borders.

When a border line is penetrated in this way, it is no longer regarded as a border, but as an ambient object. Ambient objects are ignored during any operations. For example, ambient lines between columns of a table are unaffected by moving a row. In FIGS. 12(h) and 12(i), a line gesture 176 instructs the system to move a row without affecting the two borders. Ambientness holds only for the life of the current selection.

6. Handwritten Diagrams

A. Structural Model

A diagram is meant as a node-link structure. A node is a group of graphic objects that is to be regarded as a unit, and a link is a line that goes between (joins, connects) two nodes. The links and nodes form a mathematical (topological) structure, which is more abstract than the geometric structure. That is, the topology is not concerned with where nodes are located or the shape of the links, but only with what the pattern of the links between nodes is. The user may want to change the topology by editing the links, but often the user wants to change the geometry of the diagram (to make it clearer or neater) while preserving the topology.

Figure 13A:
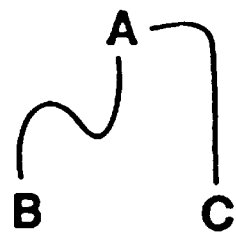
FIGS. 13(a)–13(h) illustrate operations and gestures on node-link structures for handwritten diagrams.
Figure 13B:
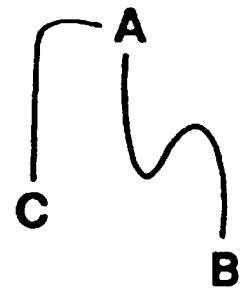

If the user wants to move a node without disturbing the topology, then the links from the node to other nodes must be distorted (reshaped) to maintain the link structure. Distorting a link involves a linear geometric transformation of the link's shape that preserves its characteristic shape while "stretching" it to fit the new positions of the nodes it connects. Further, the end point of the link is changed relative to its node if the move requires it. For example, FIG. 13(a) shows a simple diagram with three nodes (A, B, and C) and two links (A–B and A–C). FIG. 13(b) shows the diagram changed geometrically—the positions of nodes B and C are reversed and node B is lowered a bit—but with its topology preserved: A is still linked to B and to C and that the characteristic shapes of links A–B and A–C are preserved. However, link A–C emanates from the right side of node A in FIG. 13(a) and from the left side of node A in FIG. 13(b).

B. Operations and Gestures

Figure 13C:
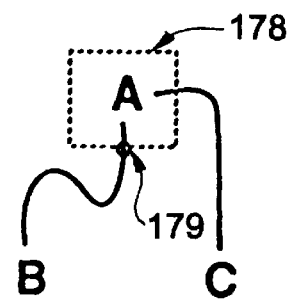
Figure 13D:
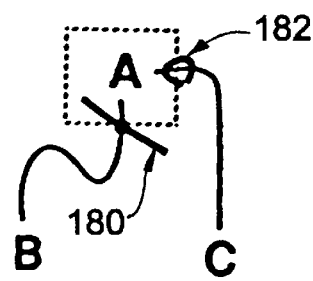
Figure 13E:
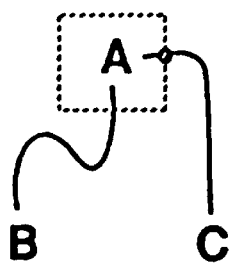
Figure 13F:
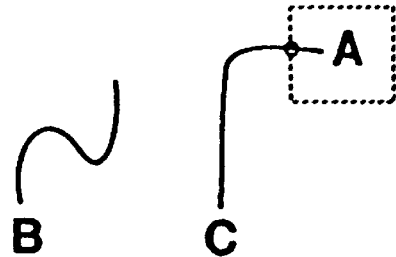
Figure 13G:
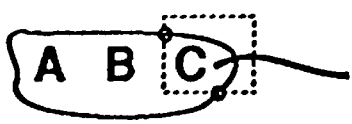
Figure 13H:
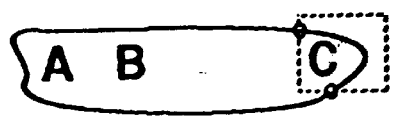

The user can select objects on the display as a node by making a rectangular-shaped gesture. The system recognizes this shape and replaces the drawn gesture with a perfectly geometric rectangle, just as it does for all the other structured selections. A node selection has one added feature that other structured selections do not have. A node selection selects all the objects it enclosed as the node, and all lines that extend out of the selection are selected as links. A selected link is indicated by a little circle 179 drawn by the user on the selection rectangle 178 (FIG. 13(c)) where the link crosses it. The user can change whether a crossing line is to be regarded as a link or not. For example, FIG. 13(c) shows node A selected and line A–B selected as a link, but line A–C not selected as a link. FIG. 13(d) shows gestures for changing the links. The slash gesture 180 through the little circle removes the link status of the line A–B, and the little-circle gesture 182 where line A–C crosses the selection rectangle changes line A–C to be regarded as a link. The result of these two gestures is shown in FIG. 13(*e*). Because of the above operations shown in FIG. 13(*d*), when node A is moved to the right, link A–C is distorted to preserve the connection, but line A–B is not changed (because it is not considered a link), and the connection between A and B is lost.

Grouping is another operation (available from a menu) which can be performed on diagrams. When a set of objects is selected and grouped, all the objects in the selection are regarded as one single object, a group object. The advantage for a user of a group object is that it can be selected simply by touching it, i.e. by a dot gesture. This makes it very easy for the user to manipulate group objects. If the nodes in a diagram are grouped (but not the links), then the diagram can be rearranged easily while preserving the topology. Further, because the system know what objects constitute the links, it can make sure that the links emanate from the nodes in the proper orientation.

One further extension of this technique is that the link distortion capability can be used to perform geometric transformations on stroke objects, i.e. objects comprised of strokes but not characters, that are not really links. For example, FIG. 13(*g*) shows three character objects A, B and C and a stroke object around them. The character object C is selected as a node. Because the enclosing stroke object intersects the enclosure rectangle in two places, it is regarded as a "link." The line gesture indicates that the node (the C) is to be moved to the right. But when it is moved, the stroke object is distorted to follow the C, as is shown in FIG. 13(*h*). This extension illustrates, again, the principles of implicit structuring—that the structure is not "inherent" in the graphic data, but rather structure is what the user sees in the data and "tells" the system, by means of gestures, to find.

7. Mixed Structure and Freeform Command

Figure 14:
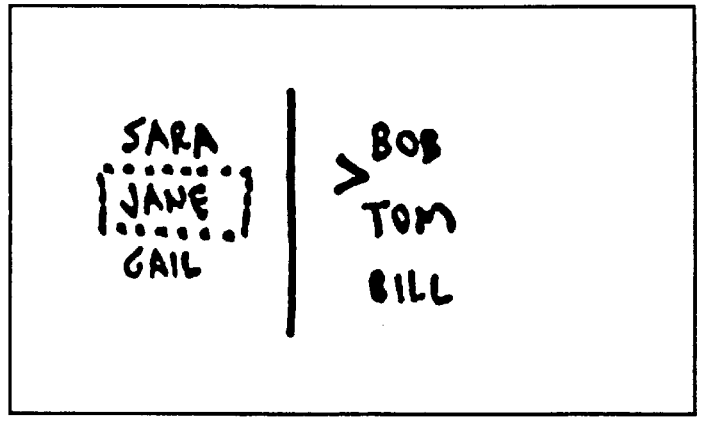
FIG. 14 illustrates operations on completely structured data.

In a display employing multiple fields of data, certain problems are encountered in dealing with cross application of editing operations. FIG. 14 shows a screen with two lists separated by a vertical line that the system interprets as a border. Thus the list on each side may be edited independently (e.g., Gail could be move to the top of the list). An operation can also affect both lists. FIG. 14 shows that Jane is selected and that a ">" gesture is telling the system to move Jane to between Bob and Tom—Gail will move up and Tom and Bill will move down to accommodate this move. Note that there is a structure on each side of the border, and the move is completely structured.

Figure 15:
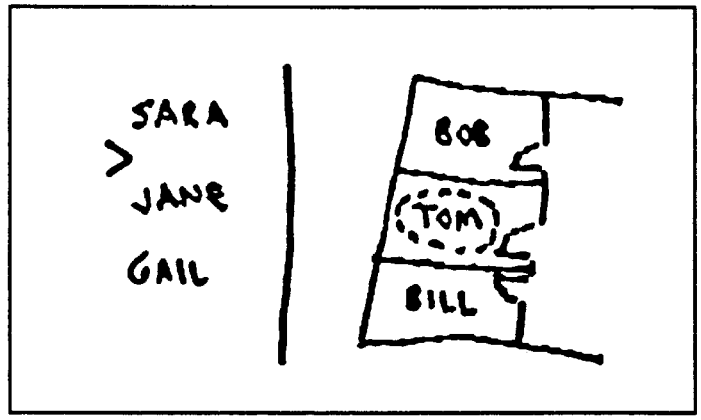
FIGS. 15 and 16 illustrate operations on mixed structures and freeform commands.

Now consider the case in FIG. 15 where there is a list on the left and a partial office floor plan on the right. The floor plan is a freeform diagram, not a structure. Suppose we want to move Jane into Tom's office, instead of Tom. If the same gestures are used as in FIG. 14, the system would not know how to alter the diagram properly. It would try to interpret it as a list—in the best case it would move Tom into Bill's office and Bill out of an office; in the worst case, it would move walls in the diagram and ruin the entire floor plan; in this case, the system would refuse to do the operation because the diagram cannot be grouped as a list. Thus, the problem is how to treat the diagram as a freeform and at the same time treat the list as a list.

The solution is to allow mixed operations. Because the selection gesture is different from the move gesture, each gesture can indicate how the material is to be treated at each end of the move. The selection can be structured (selecting it with brackets or L-shaped gestures) or freeform (using a loop), and the move can be structured (> or ˆ) or freeform (V). These can be mixed in all possible combinations.

Figure 16:
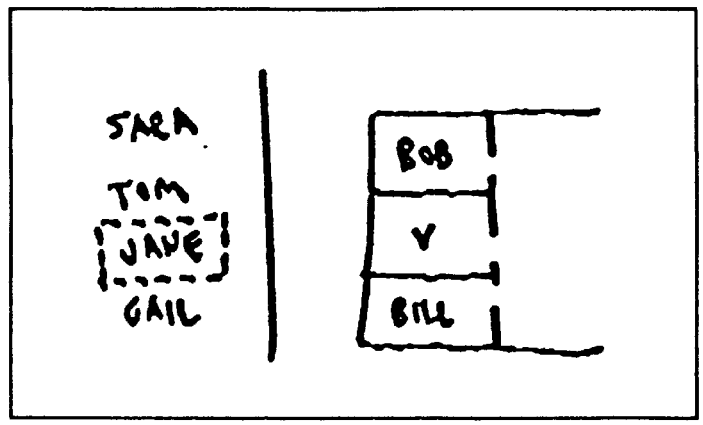

So in FIG. 15, in the first loop, select Tom and insert (>) him in front of Jane. Because Tom is freeform selected, nothing in the diagram is changed when he is moved. Because he is structurally inserted in the list Jane and Gail move down. See FIG. 16. Now we select Jane as a structured item and indicate a freeform move (V) in the diagram. Because Jane is a structured selection Gail will move up to close the space. However, because the move is freeform, nothing in the diagram will move there when Jane is moved into the empty office.

8. Table Alignment

As discussed above, an alignment operation "neatens up" the indentation levels of a list (it can also be used to clean up simple lists). A similar operation is employed for tables. The problem is that tables often are poorly aligned. People often create tables column-wise. They write items going down one column then down another. The result is that items in the rows are poorly aligned, and rows cannot be selected and moved. The solution is to create a horizontal alignment operation. To invoke this operation, a selection box is created around a table or part of a table and a horizontal alignment gesture, which consists of a horizontal line, is drawn along the top edge of the selection box. One selects the whole table and makes a horizontal alignment gesture at the top of the selection. The system analyzes the selection as a table, and moves the items successively in each column into horizontal alignment with the items in the columns on the left. The result is a neater table that can be manipulated row-wise. FIG. 17 shows a table created by a user, and FIG. 18 shows it after the system aligned it up. The alignment operation may also add spacing between rows and columns and vertical alignment of columns or both vertical and horizontal alignment of rows and columns.

9. Typed Characters as Freeform Text

This system allows characters to be typed in at the keyboard. Each character is treated as a freeform graphic object, similar to a stroke, i.e., it just occupies an x-y position on the display. Just like strokes, they are treated as freeform or as being structured depending on what gestures are used. Characters and strokes can be mixed; e.g., the user can handwrite a Greek letter in a line of typed text.

Character objects can be treated as freeform (unstructured) by selecting them with a loop selection gesture. When character objects selected this way are deleted with the standard pigtail gesture, the character (and other kind of) objects surrounding the deleted character objects are not moved. (i.e., exactly the same behavior as for stroke objects.) Similarly, the character objects can be moved anywhere, even to sit on top of other character or stroke objects. See FIGS. 19(*a*) and 19(*b*).

Character objects can be treated as structured by selecting them with one of the structure selection gestures (brackets or L-gestures). When character objects are selected this way, they can be operated upon just like the structured (i.e., list, outline, text, and table) operations on stroke objects. For example, a set of horizontally related character objects can be selected with bracket gestures and then moved with a line gesture to another place; the character objects will close up and open up appropriately. See FIG. 19(*c*) and 19(*d*). However, when character objects are selected, they receive special treatment in that they are "snapped" into alignment with nearby character objects.

For example, if a user moves characters ABC to near characters DEF, then ABC is snapped to be aligned with DEF in the most appropriate way, such as the baselines being aligned and the DEF either occurring right after ABC or with exactly one normal character space between C and D.

Additional operations are provided to allow entry and editing of text with a keyboard. First, the user needs a way to tell the system where typed character objects should be placed on the display. Thus there is a special object called the "type-in point", which is a small carat-shaped object created by the system. The user can position or reposition the type-in point either by making a dot gesture with a pen or by pointing and pressing a mouse button. If the dot is near characters, the system replaces the dot with a carat which is snapped into alignment with the nearby characters. If the dot is not near any characters, then it remains a dot. But if the user immediately begins to type at the keyboard, then the system replaces the dot with a carat. Whenever a character-producing keyboard key is pressed, a character object is placed at the right of the type-in point and the type-in point is moved over to the right of the inserted object. Thus a series of keystrokes produces a left-to-right sequence of character objects.

When "special" keys (e.g., Space, Tab, Return, Backspace) are pressed, special actions are provided. When the Space key is pressed, the type-in point is moved one character space to the right. Note that no "space character" is produced; the only effect is to move the type-in point. (Pressing the Space key is totally equivalent to repositioning the type-in point with the mouse.) If the type-in point has character objects to its immediate right, then they are pushed to the right to make room for the new character object. Pressing the Return key causes the type-in point to be moved to the left of the leftmost character on the current row of characters and then down one row so that the next character will go on the next text line (if there are characters immediately below they are pushed down by one row). A Tab key causes the type-in point to be moved to the right to align with any character objects above with space to their left; if no alignment can be found, then the type-in point is moved to a default table position. If the type-in point is pushed into a border or to the right edge of the display, then it, along with character objects to its immediate left, are moved down one row and to the left, i.e., the normal "line wrapping" behavior for text. Similarly, other special keys (e.g., Backspace, Linefeed) have appropriately-defined behaviors.

This treatment of characters produces the capability and behavior normally expected of a simple text editor. Note, however, that the character objects are totally freeform, no matter how they were input. For example, the user can loop-select a set of character objects in the middle of a typed paragraph and delete them, leaving an empty space in the middle of the paragraph. See FIGS. 19(e) and 19(f). The user can also treat the character objects in a structured way that is different from the way they were input. For example, even though some text was typed in from left to right, the character objects do not have any special left-to-right relationships (such as the conventional "string" structure of conventional text editors); part of that same text can be selected as a column and two columns of character objects can be switched. See FIGS. 19(g) and 19(h). This is a novel and flexible way to treat text, which is appropriate for a freeform editing application.

Having described above an editing system with which the invention can be used, the discussion below focuses on the present invention of using animation in conjunction with such a system.

II. Animation

Animation of changes to data in a display-oriented graphical editing system described above, clearly illustrates the effects of a structural editing change on a display device, such as a LiveBoard or other display screen, so that the user, as well as other persons in a room watching the user's actions, can clearly see and get a better understanding of the changes to the various elements. The invention also enables a person employing a personal computer, such as a personal tablet computer, to more clearly understand the manner by which the system reacts to his or her input. Hence, the animation feature in accordance with the invention can be employed as an educational tool to enable students to appreciate the effects of the different operational commands, as well as to enhance practice sessions on the display device, such as a LiveBoard, touch screen or other data interface surface.

Therefore, in this invention, a user selects at least a portion of data displayed on the display device. The data is an object or a group of objects. The selection itself can be either freeform or structured and is made by drawing an appropriate gesture, as described above, with a control or interacting device 42 (FIG. 1), such as a stylus or light pen, or with a mouse.

Next, one selects an editing operation to be performed on the selected object or group of objects using an operation command. As discussed above, the operation command may be invoked using the control or interacting device 42 to draw an appropriate gesture, by selecting one of the accessible functions 40 (FIG. 2) or by a choosing a selection from a pop-up menu. The animation effect may be controlled in the operation 130 of FIG. 7 for freeform selections, and in the operation 136 of FIG. 7 for structured selections.

The computer system then performs the specified editing operation on the selected displayed object or group of objects using computer processing circuitry coupled to and responsive to the control or interacting device 42.

Whether the selection is freeform and/or structured, the system animates both the change to the selected object or group of objects, such as movement to a new location or expansion/shrinking, and the changing of the characteristics such as position or size of the other object or group of objects on the screen which accompany such a change. The objects are shown as changing gradually at a visually apparent rate, rather than changing instantaneously.

The main change, which is the change to the object or group of objects selected by the user, is referred to as the "prime change" and the changes to the other objects on the display are "contextual changes." These contextual changes maintain the structure of the text.

Different structural assumptions made by the computer based on the gestures used will result in different contextual changes, even for the same prime change. Therefore, the animation has the additional effect of making clear to the user the particular structural assumptions that are triggered.

Each of the prime and contextual changes are individually animated as occurring in a series of steps (or iterations), the exact number of steps being determined by a timing control function, described below, which is programmed into the system. The prime and contextual changes performed in response to an operation command may be animated simultaneously. Alternatively, changes may be animated sequentially so that, for example, in response to a move command, a space may be initially opened up at the destination (viz., the final location to which the selected object or group is to be moved), following which the selected text is moved to the space thus opened up, and followed by the closing up of the space from whence the text originated, all of which occurs at a visually appreciable rate.

In the simplest form of animation showing movement of objects, all moves, including prime and contextual changes, are shown as moving in straight lines from the original, source location to the destination at a linear, constant rate. If, as part of the straight line animation, more than one object must pass through the same location on the display at the same time, the objects are shown as passing through one another.

For example, in FIG. 20(a), the word "windows," has been selected as a structured selection 184 with an appropriate gesture or gestures such as by drawing a left bracket 63 (FIG. 5). A caret 185 has also been drawn between the words "dialogs," and "icons" indicating to the system that the word "windows," should be moved from its current position in the list and inserted between and on the same line as the words "dialogs," and "icons". This is the prime change in this example. Two contextual changes are necessary to accommodate this prime change. First, a space large enough to accommodate the word "windows," must be opened between the words "dialogs," and "icons" and, second, the words "testing" and "debugging" must move upwards in the list so that the space vacated by the word "windows," is closed up. FIGS. 20(b)–20(k) illustrate the prime and contextual changes being animated simultaneously in ten steps. Each consecutive figure shows the objects as having moved an additional ⅒th of the total distance along their paths towards their destinations. Each object (or "word") moved moves in a linear path from its original source location to its final location.

Each moving object passes through any other objects in its path so that one object might overlap another object. This can be seen in FIG. 20(h) where the words "windows," passes through the word "display".

FIGS. 21(a)–(k) illustrate another example of animation of changes resulting in the movement of a word within a line to a new location on that line. In FIG. 21(a), the word "not", shown surrounded by box 187, is selected and a caret 189 is placed before the word "all". This specifics the prime change, viz., the word "not" is to be moved to a position immediately to the right of the position of carat 189. The simultaneous contextual change is the movement of the words "all that glitters is" to the right so that a space is opened before the word "all" and the space between "is" and "gold" is closed. All changes are animated simultaneously in ten steps in FIGS. 21(b)–21(k), with the word "not" moving from its original location to its destination.

Once the movement of the objects begins the caret disappears from the display. Thus, no caret 185 is shown in FIGS. 20(b)–20(k) and caret 189 does not appear in FIGS. 21(b)–21(k).

Since the word "not" passes through other words in the line in FIGS. 21(b)–21(k), it is not especially clear to the user or others which is the prime change and which is the contextual change. To make the distinction between prime and contextual changes clearer to the user, the prime change can be highlighted. One way to do this is to show the prime change as moving in a non-linear movement such as an arc (either circular or parabolic) from its original location to its destination location, while the contextual changes are shown as moving in a straight line. FIGS. 22(a)–22(k) are identical to FIGS. 21(a)–22(k) except that they illustrate a prime change, viz., the movement of the word "not", being animated in a non-linear movement by moving above the words "all that glitters is" into the empty space that has formed before the word "all".

Sometimes it is difficult to understand a complex change if several objects are changing simultaneously in different directions. Therefore, instead of animating the prime and contextual changes simultaneously, the changes can be illustrated sequentially so that the user only has to comprehend one change at a time. FIGS. 23(a)–23(d) illustrate such an animation. In FIG. 23(a) the word "not" is again selected and a carat indicates to the system to move the word "not" before the word "all". In the resulting first step shown in FIG. 23(b), the system animates the opening of a space before the word "all" which is large enough for the selected word "not". Next, as FIG. 23(c) shows, the move of the word "not" into the empty space that was created is animated. Finally, as a third step (FIG. 23(d)), the vacant space between the words "is" and "gold" is closed.

An object could also be animated as changing at a rate that varies. For example, the object could move quickly from a source location to the approximate destination and then move slowly into its exact destination. The animation architecture also allows the specification of the type of move for each part in a change, the default being a linear, constant-rate move.

In addition to the animation of movement changes, animation may also be provided for other types of changes, such as morphing, copying, scrolling, opening and closing space, shrinking, expanding, rotation and distortion. Color changes could also be animated by showing the color changing gradually, rather than changing immediately, to the newly selected color. To animate a color change, a path through color space would have to be calculated so that the system knows what color should be displayed at each step during the animation of the color change. Animation of certain of these changes obviously requires more powerful computer hardware than animating movement changes.

The animation is integrated with the standard interactive graphic technique of dragging. After the user selects an object or group of objects, he can drag them dynamically to the desired location. During dragging, the objects "stick" to the pen or control device. Once the user terminates the drag operation (e.g., by lifting the pen), the objects stay in their new location. If the selection is freeform, then nothing further needs to be done. But if the selection is structured, then more has to be done to properly position the objects within the structure. This is where the animation comes in. Suppose the user intends to move the objects to location y. First, he drags the selection to a location y", which is near y (because it is very difficult to drag to an exact location). Then the system animates the movement of the selection from y" to y, simultaneously animating the contextual changes to objects. This is illustrated in FIG. 24, which shows the same word move as in FIG. 21. After selecting the word to be moved (FIG. 24(a)), the user drags the word to near the intended destination (FIG. 24(b)). Then the system animates the rest of the move operation by moving the word into its exact final location and simultaneously animating the contextual changes to the surrounding objects (FIGS. 24(c–j)).

Figure 25:
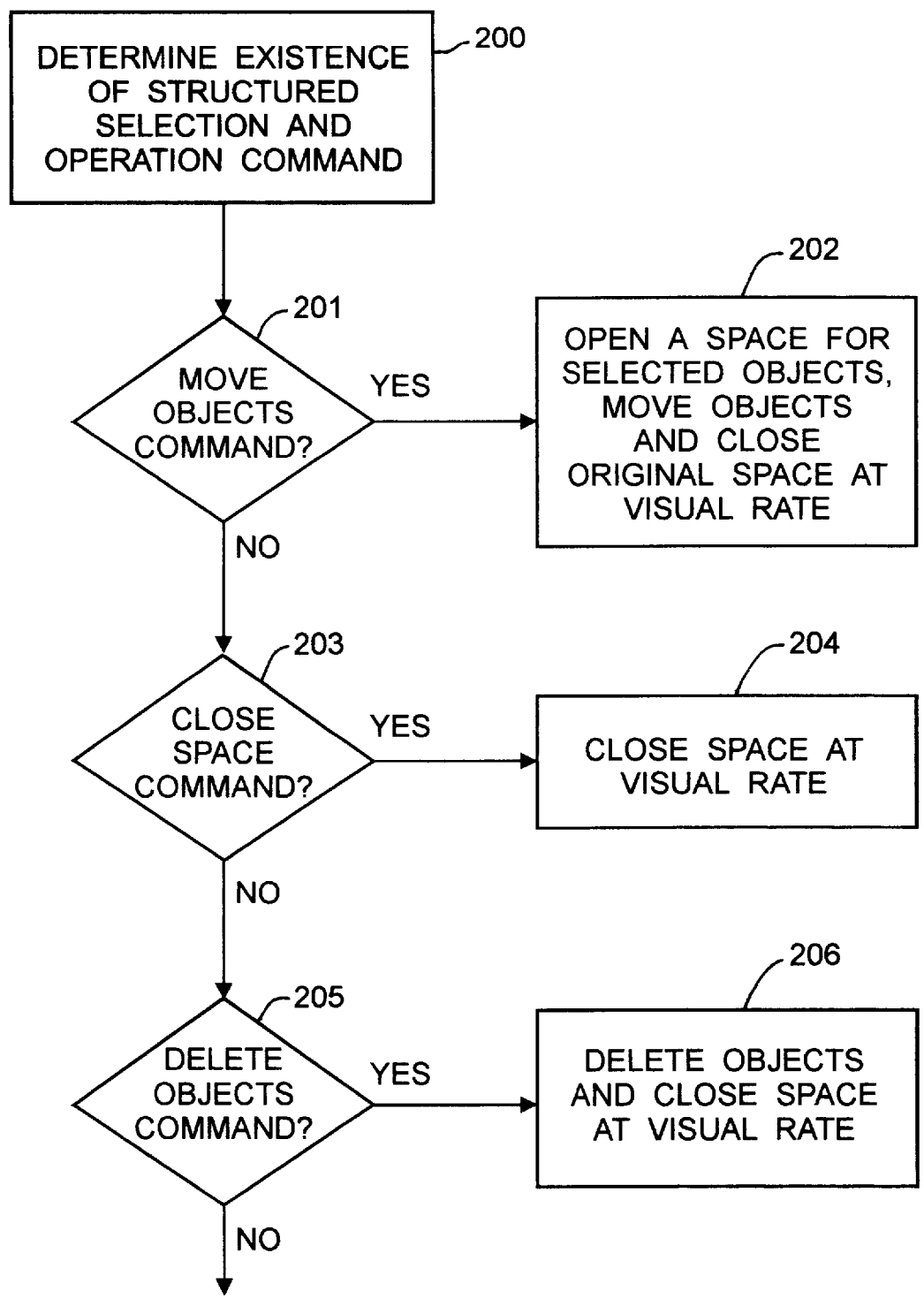
FIG. 25 is a flow diagram of an animation routine in accordance with the invention.

A flow diagram illustrating one procedure for effecting animation of movement is illustrated in FIG. 25, wherein, at block 200, the determination is made of whether a valid structured selection has been made, and whether a valid operation command has been received. Once both conditions are true, which would be at block 130 of FIG. 7 for freeform selections and at block 136 (FIG. 7) for structured selections, a determination is next made of the particular operation command received. If the operation command is a command to move objects, block 201, then, as illustrated at block 202, the system opens up a space for the intended destination of the selected objects, moves the objects to the space thus opened up, and then closes the space from which the objects originated. These movements are made at a visual rate, which make the changes visually apparent to the user.

If, however, the operation command is a command to close a space in the display, as determined at block 203, then the space is closed at a visual rate at block 204. Similarly, if the operation command is a command to delete objects, as determined at block 205, then the objects are deleted and the space closed, again at a visual rate, at block 206. The deletion step may be effected by a gradual dimming of the selected text. Similar operations may be effected for the other available operation commands, as discussed above.

The timing of the animation is particularly important. The movement of the relevant portions of the information on the display screen must be slow enough for the changes to be visually apparent. Yet, if the movement is too slow, the animation becomes more annoying than helpful. The actual physical rate of movement to constitute a visually apparent rate depends of course upon the relative positions of the observer and the display panel, and should be adjusted so that the time for the total movement of information elements in a given operation is preferably about one second or slightly less.

Figure 26:
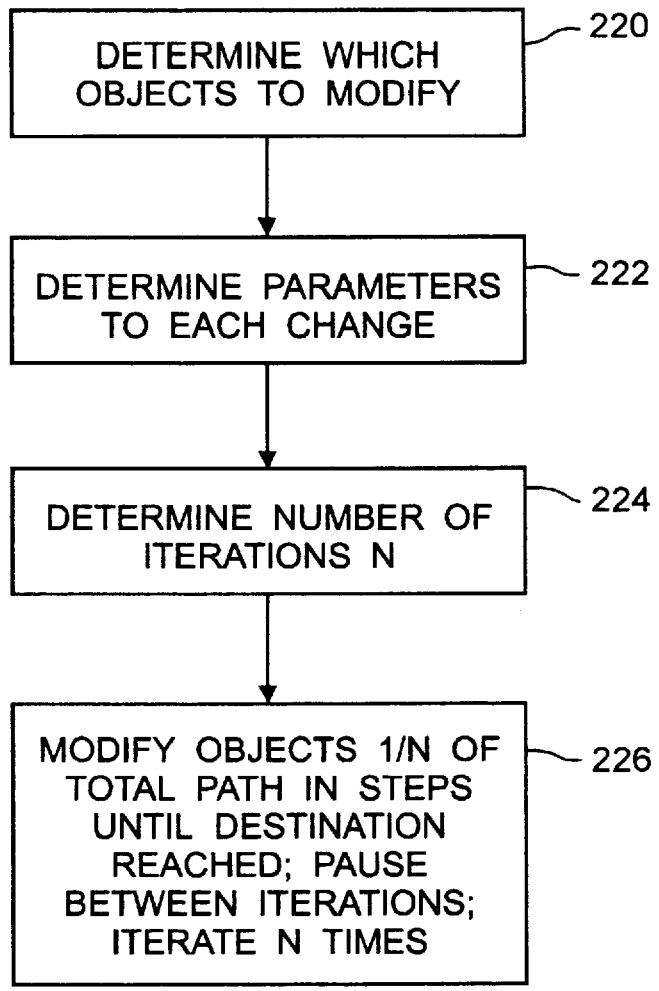
FIG. 26 is a flowchart of a timing control algorithm used to control the time of the animation provided for by this invention.

To control the timing of the animation, a timing control function is incorporated in the computer system. A four-step timing control algorithm is illustrated by the flowchart in FIG. 26. In the first step, block 220, the system determines which object or groups of objects on the display must be manipulated in response to the operation command, such as a move, delete or expanding/shrinking operation (in other words, the system determines on which object or group an operation must be performed), and what the final location, appearance or other characteristic of each object or group should be. For example, if the user asks to move the fourth item in a list after the first item and before the second item, then the second and third items must be moved down to make space, and the fourth item must be moved up to where the second item started. The first item and every item below the fourth item are unaffected.

The second step of the algorithm, block 222, comprises determining the parameters for each change to be animated. Where the object or group of objects is to be moved, this comprises computing a trajectory for each object or group of objects to be moved from the object's or group's current location to its final location. The simplest trajectory is a straight line. However, one might choose to have the selection (or perhaps another interesting group) follow an arc to make the group's motion more conspicuous. In this step, the current location of each object or group is the significant location. The current location will be the original location in both the freeform and structured modes where the user has chosen to move the object or group of objects by making a selection and designating a destination y (freeform mode) or y" (structured mode). Where the move has occurred by "dragging" though, the group of objects comprising the selection has already been moved close to its final destination by the user's dragging it there so the current location, from which the trajectory is computed, is not the original location but is rather wherever the user left the object after dragging. In the structured mode, the object will move into place from its current location y" to y.

When an object is expanded/shrunk, for example, the parameters may be determined to show the selected object simply expanding/shrinking in size while the surrounding objects decrease/increase in size. Where a "change color" operation is to be performed, at this second step the parameters selected include what colors should be displayed during the change and at what rate to pass through color space. Similarly, other editing changes would require the determination of their relevant parameters at this second step in the timing control function.

The third step, illustrated at block 224, is to determine the number of iterations (or animation steps) N in which to perform the animation. N is a function of the user's preferred animation speed, which may be user-selectable, and the complexity of the animation. The slower the desired animation speed, the more iterations are required. A sufficiently complex animation, which may be complex, for example, because of the number or sizes of the groups of objects, may be animated in fewer iterations, or may require that the quality of the image displayed be somewhat degraded in order for the animation to be quick enough to achieve the desired speed. A preferred choice for a default animation speed results in an animation that takes approximately one second.

The number of steps required to complete an operation varies in dependence upon the number of changes which must be made and the operation to be performed. Generally, the animation speed should be selected so that N is at least 10. However, the animation may be performed in fewer than 10 iterations (i.e., N<10). If a very small change is made the animation might only require a single step.

To select an appropriate value for N, one must conduct empirical tests to determine the amount of time it takes a particular computer processor and program to redisplay changes in the displayed material. The redisplay time is usually a function of the amount of material being redisplayed, as measured for example by the area being redisplayed. Let D be the empirically-determined time (in seconds) to redisplay a unit of the display. Let A be the area to be redisplayed. Let T be the total animation time (in sec) desired. (Normally, this is one second, but the user can be provided with a user-interface control to vary this time.) Thus, the number of animation steps, N=T/AD.

An alternative, more sophisticated, method of determining an appropriate value for N is to explicitly time the steps of the animation so it takes exactly T seconds. Set the number of animation steps, N, to be at least 10. This method works when the processor is fast enough so that the redisplay takes less than T/N sec. In this method, after each step of the animation is made, an internal clock is used to pause the program so that the steps occur at exactly T/N second intervals.

In the fourth step, block 226, for N times, each object or group of objects on the display is changed 1/N of the total change set by the parameters determined in the second step of the timing control function during each iteration. The system pauses between iterations as needed so that each iteration takes 1/N of the desired animation time. In this step, each iteration results in erasing the objects manipulated and the redisplaying of the objects at their new position, with a new appearance and/or other new characteristics an additional 1/N of the specified total change. Using this timing control function, all changes, including prime and contextual changes, may be animated simultaneously with each object to be manipulated being manipulated in N iterations with each step being animated as 1/N of a total change.

For example, in this fourth step, when objects are to be moved, each object or group moves 1/N of the distance over the trajectory computed in the second step for N times until the object or group reaches its destination. Double buffering is used during the move to avoid flicker on the display device.

As an alternative to animating changes at a constant rate in the fourth step of this timing control function, the system can be programmed to animate changes at a variable rate as described above in order to make the animation appear more natural. An algorithm for variable-rate animation of movement of objects is provided in Appendix B. Using this algorithm, the objects to be moved are animated as moving to their destinations in N steps of not necessarily equal distance for a given length of time. During each successive Nth step until the objects approach their destinations, the objects move a distance which is progressively larger than the distance moved in the previous (N−1)th step so that the objects are animated as constantly accelerating until reaching a top speed as they approach their destinations. Thereafter, the objects are animated as constantly decelerating, moving a distance which is progressively smaller in each successive Nth step until the objects finally reach their destinations. The acceleration and deceleration need not be constant although that is presently preferred and is embodied in the algorithm provided.

The programming for carrying out the animation may be stored in a computer hardware memory storage device such as a read-only Memory device like program ROM 26 (FIG. 1) or may be included in a software product having the requisite programming and stored in a data storage device such as a hard drive. Instructions provided in the Read-Only Memory or software product are performed by a processing unit in the system. A sample source code for programming a computer software in the C++programming language to carry out the timing control function described above is attached as Appendix C.

Although the changes to an object such as a move from its original location to its destination are animated on the display as changing at a reduced speed, rather than being displayed instantaneously, the actual operations on the data structures within the computer are not slowed by the use of animation.

The animation feature of the invention is not limited to the specific techniques discussed above, and may be employed, in accordance with the invention, in combination with any operation on the display screen in which such animation will enhance the observer's appreciation of the techniques of controlling a display-oriented graphical editing system.

Although the invention has been described with reference to preferred embodiments, it will be apparent to one skilled in the art that variations and modifications are contemplated within the spirit and scope of the invention. For example, instead of using a touch screen as the display device, an ordinary display device can be used and gestures can be drawn, albeit awkwardly, with a mouse. The drawings and description of the preferred embodiments are made by way of example rather than to limit the scope of the invention. The invention covers all changes and modifications within the spirit and scope of the claims.

APPENDIX A

```
LineGrouping:PROCEDURE [Coord y] RETURNS[ObjectList]
        ObjectList strokesOnLine=EMPTYLIST;
        Coord lineTop,lineBottom;
        [lineTop, lineBottom]=FindLineBoundaries(y);
        FOR object In GetStrokesOnScreen() DO
                IF ResidesOnLine(object, lineTOP, lineBottom)
                        THEN AddToList(strokesOnLine, object);
        RETURN strokesOnLine;
FindLineBoundaries: PROCEDURE[Coord y] RETURNS [Coord, Coord]
        InkDensity density=YDensity(LineBoundariesThreshold);
        Coord lineTop=GoUpUntilDensityIsZero(y, density);
        Coord lineBottom=GoDownUntilDensityIsZero
        (y, density);
        RETURN [lineTop, lineBottom];
FindBaseline: PROCEDURE [ObjectList strokesOnLine]
RETURNS [Coord]
        InkDensity density=YDensity(BaselineThreshold);
        Coord yMid=YMidpoint(BoundingBox(strokesOnLine);
        RETURN GoDownUntilDensityIsZero(yMid, density);
YDensity: PROCEDURE [float threshold] RETURNS
[InkDensity]
        InkDensity density;
        FillWithZeros(density);
        float dy=ScreenHeight/NStrips;
        --Compute raw stroke density
        FOR object IN getStrokesOnScreen() DO
                FOR i IN [0..NStrips]DO
                        IF ObjectContainsInterval(object,i*dy,
                        (i+1)*dy)
                                THEN density[i]=density[i] + 1;
        --Now normalize
        float cutOff=Average(density)* threshold;
        FOR i IN [0..NStrips] DO
                density[[i]=IF density[i] cutOff THEN 1 ELSE 0;
        RETURN density;
```

APPENDIX B

```
float
Animator: :moveCoefficient(int i, int iMax)
{
        // iMax is the number of steps in a move
        // returnVal is the percentage along the total movement
        //      that should be reached at the i-th step
        // i in [0, iMax−1]
        // returnVal is a coefficient in [0, 1]
        // if i is iMax − 1, return 1.0 to prevent roundoff errors
        if(i>=(iMax − 1)
                return (float) 1;
        // fit on s-shaped curve
        // convert to floats
        float t=(float) i,
                tMax=(float) iMax;
        float returnVal;
        float tMaxHalf=tMax/2;
        if(t<tMaxHalf)
        {
                float u=t/ tMaxHalf;// u at most 1
                returnVal=u*u/2; // returnVal at most 0.5
        )
        else
        {
                // (t>=tMaxHalf)&&(t<tMax)
                float u=(t − tMaxHalf)/tMaxHalf;
                float w=(float) 1.0 − u; // between 0 and 1
                returnVal=(1 − w*w)/2 + (float) 0.5;
                // returnVal at most 1.0
        }
        // just in case:
        Max(returnVal,(float)0);
        Min(returnVal;(float)1);
        return returnVal;
}
```

Appendix C

```
class MoveSpec {
public:
    MoveSpec(ObjectList *objs = NULL, Point *off = NULL, Boolean isc = False)
    : objects(objs), offset(off), isCopy(isc) { }
    ObjectList    *objects;
    Point         *offset;
    Boolean       isCopy;
};
class CompoundMoveSpec {
public:
    CompoundMoveSpec(MoveSpec *mvs, int n) : specs(mvs), nspecs(n) { }
    Movespec      *specs:
    int           nspecs:
};
void
DisplayManager::compoundMove(Device *device, Slide *newSlide,
                             CompoundMoveSpec *mspec.
                             ObjectList *newObjectVec, ObjectList *newSelectors)
{
    int nmoves = mspec->nspecs;
    Sheet ** flts = new Sheet*[nmoves];
    int i:
    SlideMap *newMap = newSlide->getSlideMap( );
    SelSheet *selection = findSelection(device);
    int firstFlt = 0;
    Boolean doArcs = False, arcX = False;
    Coord *arcSteps = NULL;
    for (i=0; i < nmoves; i++)
        {
        MoveSpec &spec = mspec->specs[i];
        ObjectList *objects = spec.objects:
        Boolean nextIsOriginal = (i < nmoves-1 &&
                                  mspec->specs[i+1].objects == objects);
        Sheet *flt;
        Sheet *fromSheet;
        if (objects == NULL)
           {
           // Designates device's selection
           if (!selection)
              fatal_error(°DM: compoundMove selection spec with no selection*);
           fromSheet = selection->parent;
           if (spec.isCopy & !nextIsOriginal)
              // Leave behind the original
              fromSheet->drop(selection, True);
           flt = selection;
           }
        else if (objects->size( ) > 0 &&
                newObjectVec[i].size( ) > 0)
           {
           // Need to make a floater
           if (selection && selection->objects.intersects(objects))
              {
              // lift it off selection
              if (!selection->objects.includes(objects))
                 ErrorPrint(°DM: attempt to move objects overlapping the selection\n*);
              from:Sheet = selection;
              }
           else
              {
                 fromSheet = (*objects)[0]->getSlide[ ]->getSlideMap( );
              flt = fromSheet->makeFloater(objects);
              fromSheet->lift(flt, (spec.isCopy && !nextIsOriginal));
              }
           else
              {
              /* Null object list, or null replacement list. The former happens if
                 the partitioning of objects came up empty for part of a compound move: th
                 former if it turns out that a zero move was computed for some object set
              flts[i] = NULL;
              if (i == firstFlt)
                 firstFlt++;
              continue;
              }
           flts[i] = flt;
           if (nextIsOriginal)
              {
              // Original wants to move, too
              Sheet *cop = flt->copy( );
              flt->parent->addFloater (cop);
```

-continued

Appendix C

```
                flts[++i] = cop;
            }
        else if (fromSheet->slide != newSlide)
            {
                // Changing slides. Note that this is not allowed
                // if we're both copying and moving the same set of objects.
                flt->detachFromSlide (spec. isCopy);
                newMap->addFloater (flt);
                // Note: newslide is temporarily in an illegal state, with a floater with
                // old objects, none of which are in its object list
                spec.isCopy = True;
                // Fakery: contentsMoved will add new objects to new parent
            }
    }
if(firstFlt == nmoves)
    {
        ErrorPrint(*compoundMove: %d moves, but no objects!\n*, nmoves);
        return;
    }
if (newSlide == currentSlide)
    {
        // Okay, there's something to watch, so move 'em around
        Coord *xSteps = new Coord[nmoves],
            *ySteps = new Coord[nmoves],
        // Compute how much to move each floater per animation step
        // Approximate the cost of the move by the bounding box of all floaters
        Rectangle bounds:
        for (i=firstFlt: i < nmoves; i++)
            if (flts[i])
                bounds.extendToInclude (flts[i]->boundingBox( )):
        int nsteps = computeAnimationSpeed (bounds.area( ));
        for (i=firstFlt; i < nmoves: i++)
            if (flts[i])
                {
                    Point *off = mspec->specs[i].offset;
                    Point &done = flts[i]->displaced;
                    Coord dispX = off->getX( ) - done.getX( ),
                        dispY = off->getY( ) - done.getY( );
                    xSteps[i] = dispX / nsteps;
                    ySteps[i] = dispY / nsteps;
                    if (useArcedAnimation &&
                        flts[i] == selection &&
                        nsteps > 1)
                    {
                        // maybe arc this trajectory
                        if (AbsCoord(dispX) < arcEpsilon)
                            {
                                if (AbsCoord(dispy) × 10*AbsCoord(dispX))
                                    arcX = doArcs = True:
                            }
                        else if   (AbsCoord(dispY) < arcEpsilon &&
                                AbsCoord(dispX) > 10*AbsCoord(dispY))
                            doArcs = True:
                        if (doArcs)
                            {
                                Coord len = AbsCoord(arcX ? dispY : dispX):
                                Coord step = len / nsteps;
                                Coord height = len*arcHeightWidthFactor;
                                // Radius r is such that (len/2)^2 + (r-height)^2 = r^2
                                // => L^2/4 + R^2 - 2HR + H^2 = R^2
                                // => L^2/4 +H^2 = 2HR
                                Coord radius = (len,*len/4 + height*height)/(2*height);
                                Coord rSquared = radius*radius;
                                arcSteps = new Coord[nsteps];
                                // X arcs go right (positive). Y arcs go up (negative)
                                float sign = arcX ? 1 : -1;
                                int midIndex = nsteps/2 - 1;
                                // note nsteps is even, so there is a midpoint
                                for (int j=0; j <= midIndex; j++)
                                    {
                                        // x^2 + y^2 = r^2, so x = sqrt(r^2 - y^2)
                                        // The arc is symmetric, so we can fill in both sides at once
                                        Coord y = (midIndex - j) * step;
                                        arcsteps[j] = arcSteps[nsteps - j - 2] =
                                            sqrt(rSquared - y*y) * sign;
                                    }
                                // Those were absolute. For the iteration, we need relative moves
                                Coord initial = (radius - height) * sign;
```

Appendix C

```
                    Coord prev = initial;
                    for (j=0; j < nsteps-1; j++)
                        {
                            Coord y = arcSteps[j];
                            arcSteps[j] = y - prev;
                            prev = y;
                        }
                    // Final step takes us back down, and adjusts to final location
                    arcSteps[nsteps-1]= initial - prev + (arcX ? dispX : dispY);
                }
        }
    // Now move them
    for (int s = 0; s < nsteps; s++)
        {
            Rectangle rect;
            for (i=firstFlt; i < nmoves: i++)
                if (flts[i])
                {
                    rect.extendToInclude(flts[i]->boundingBox( )); // before . . .
                    if (doArcs && flts[i]== selection)
                        {
                            if(arcX)
                                flts[i]->displace(arcSteps[s], ySteps[i]);
                            else
                                flts[i]->displace(xSteps[i], arcSteps[s]);
                        }
                    else
                        flts[i]->displace(xSteps(i], Ysteps[i]);
                    rect.extendToInclude(flts]i]->boundingBox( )); // . . . and after
                }
            updateRectangleOnDisplay(newMap, &rect);
            animationSyncStep( );
        }
        delete [ ] xSteps:
        delete [ ] ysteps:
        if (doArcs)
            delete [ ] arcSteps;
    }
    // Finally, adjust the objects
    for (i=firstFlt; i < nmoves; i++)
        {
            Sheet *flt = flts[i];
            if (flt)
                {
                    MoveSpec &spec = mspec->specs[i];
                    if (flt == selection)
                        selection->contentsMoved(spec.offset, &newObjectVec[i],
                                    newSelectors.spec.isCopy);
                    else
                        {
                            flt->contentsMoved(spec.offset, &newObjectVec[i], spec.isCopy);
                            flt->parent->drop(flt, False);
                            delete flts[i];
                        }
                }
        }
    delete flts;
}
Boolean
DisplayManager::moveFloater(Sheet *flt, Slide *newSlide,
                const Point *offset. Boolean isCopy)
{
    // Caller must call ContentsMoved after this, since we'll only
    // move the floater if it's on the current slide.
    Boolean changedSlides = newSlide != flt->slide;
    if (changedSlides)
        {
            flt->detachFromSlide (isCopy);
            newSlide->getSlideMap( )->addFloater(flt);
            // Note: newslide is temporarily in an illegal state, with a floater with
            // old objects, none of which are in its object list.
            // Caller's contentsMoved will add new objects to new parent
        }
    if (newSlide == currentSlide)
        {
            // There's some visible action
            Coord dx = offset->getX( ) - flt->displaced.getX( );
```

-continued

Appendix C

```
        Coord dy = offset->getY( ) - flt->displaced.getY( );
        Coord maxCoord = Max(AbsCoord (dx), AbsCoord (dy));
        int nsteps = Min(computeAnimationSpeed(flt->boundingBox( )->area( )),
                    Round(maxCoord/minAnimationIncrement));
        Coord stepX = dx / nsteps:
        Coord stepY = dy / nsteps:
        while (nsteps > 0)
          {
            dragFloater(flt. stepX, stepY);
            animationSyncStep( );
            nsteps--;
          }
    }
return changedSlides;
```

We claim:

1. A display-oriented graphical editing system comprising:
a display device for displaying data;
a gesture-based graphical editing system wherein the displayed data on the display device is entered as strokes which are amenable to stroke operations, wherein there are no pre-defined structural groupings of the strokes upon entry, and wherein the gesture-based editing system can, on demand, interpret a set of the strokes as anyone of several different kinds of structures;
means for selecting at least a portion of the displayed data to be a particular kind of structure;
means for selecting at least a portion of displayed data for an editing operation; and
means for performing said editing operation on said selected display data, including means for animating a prime change to said selected displayed data and means for animating contextual changes to said displayed data not selected by said selecting means, said contextual changes resulting from said prime changes, said prime and contextual changes resulting from said editing operation occurring at a visually apparent rate, and said animation being performed automatically subsequent to said selection of said editing operation to be performed on said selected display data.

2. The display-oriented graphical editing system of claim 1 wherein said animating means comprises means for animating at least one of said changes in more than one step.

3. The display-oriented graphical editing system of claim I wherein said animating means comprises means for animating at least one of said changes within an amount of time selectable by a user of said system.

4. The display-oriented graphical editing system of claim 1 wherein said animating means comprises means for animating at least one of said changes in a time period of approximately 1 second or less but greater than 0 second.

5. The display-oriented graphical editing system of claim 1 wherein said animating means comprises means for animating said changes in steps.

6. The display-oriented graphical editing system of claim 1 wherein said animating means comprises means for animating each of said changes in sequence.

7. The display-oriented graphical editing system of claim 1 wherein at least one of said changes comprises movement of said displayed data and wherein said animating means comprises means for animating the movement of said displayed data in a straight-line from a source location at which said displayed data is originally to a destination location.

8. The display-oriented graphical editing system of claim 1 wherein at least one of said changes comprise movement of said displayed data and wherein said animating means comprises means for animating the movement of said displayed data in a non-linear move from a source location at which said displayed data is originally to a destination location.

9. The display-oriented graphical editing system of claim 1 wherein said animating means comprises means for animating at least one of said changes on said display device at a rate that varies during an animation.

10. The display-oriented graphical editing system of claim 9 wherein said at least one change is a movement of a displayed object and wherein said means for animating at least one of said changes at a rate that varies accelerates said movement until reaching a top speed when approaching a destination and thereafter decelerates said movement until finally reaching its destination.

11. A method for illustrating editing changes to data on a display device of a computer system operating under a gesture-based graphical editing environment, wherein the data entered into the computer system consists of strokes which are amenable to stroke operations, wherein there are no pre-defined structural grouping of the strokes by the gesture-based graphical editing system, and wherein the gesture-based editing system can, on demand, interpret a set of strokes as any one of several different kinds of structures, the method comprising:
inputting a gesture command in association with a selected portion of the displayed data so as to temporarily regard the selected portion of the displayed data as a particular kind of structure;
selecting an editing operation to be performed on said selected displayed data; and
performing said editing operation on said selected displayed data in accordance with the kind of structure the selected data is defined, including,
animating a prime change to said selected displayed data and any contextual changes to said displayed data not selected but which result from said prime change, said prime and contextual changes resulting from said editing operation occurring at a visually apparent rate, and said animation being performed automatically subsequent to said selection of said editing operation to be performed on said selected displayed data.

12. The method of claim 11 wherein said step of animating comprises animating at least one of said changes in more than one step.

13. The method of claim 11 wherein said step of animating comprises animating at least one of said changes to said displayed data within an amount of time selectable by a user of said system.

14. The method of claim 11 wherein said step of animating comprises animating at least one of said changes to said displayed data in a time period of approximately 1 second or less but greater than 0 second.

15. The method of claim 11 wherein said step of animating comprises animating said changes to said displayed data substantially simultaneously in steps.

16. The method of claim 11 wherein said step of animating comprises animating each of said changes to said displayed data in sequence.

17. The method of claim 11 wherein said changes comprise movement of said displayed data and wherein said step of animating comprises animating the movement of said displayed data in a straight-line from a source location at which said displayed data is originally to a destination location.

18. The method of claim 11 wherein said changes comprise movement of said displayed data and wherein said step of animating comprises animating the movement of said displayed data in a non-linear move from a source location at which said displayed data is originally to a destination location.

19. The method of claim 11 wherein said step of animating comprises animating at least one of said changes on said display device at a rate that varies during an animation.

20. The display-oriented graphical editing system of claim 19 wherein said at least one change is a movement of a displayed object and wherein said step of animating at least one of said changes at a rate that varies comprises accelerating said movement until reaching a top speed when approaching a destination and thereafter decelerating said movement until finally reaching its destination.

21. A display-oriented graphical editing system for use with a large scale display which allows for informal handwritten input with an input device, the large scale display being viewed by a plurality of observers other than a user inputting data via the input device, the system comprising:
 a data interface surface;
 an interacting device for entering gestures on said data interface surface to select at least a portion of displayed data and to select an editing operation to be performed on selected display data; and
 computer processing circuitry coupled to and responsive to said interacting device which is programmed to perform said editing operation on said selected displayed data and to animate said editing operation on said displayed data including animating a prime change to said displayed data and animating contextual changes resulting from said prime change of said editing operation at a visually apparent rate, said animation being performed automatically subsequent to said selection of an editing operation to be performed on selected display data.

22. The display-oriented graphical editing system of claim 21 wherein said data interface surface is a touch screen.

23. The display-oriented graphical editing system of claim 21 wherein said interacting device is a stylus or mouse.

24. The display-oriented graphical editing system of claim 21 wherein said computer processing circuitry comprises a Read-Only Memory device.

25. The display-oriented graphical editing system of claim 21 wherein said computer processing circuitry comprises a data storage device in which a computer program for performing said editing operation and said contextual changes is stored and a processing unit which performs instructions provided in said computer program.

26. A method for animating editing changes to a plurality of objects displayed on a display device of a computer comprising the steps of:
 operating the computer under a gesture-based graphical editing environment, wherein the objects entered into the computer consist of strokes which are amenable to stroke operations, wherein there are no pre-defined structural groupings of the strokes by the gesture-based graphical editing system, and wherein the gesture-based editing system can, on demand, interpret a set of the strokes as any one of several different kinds of structures;
 inputting a gesture command in association with a selected portion of the objects on the display device, the gesture causing the selected objects to temporarily be regarded as any one of a handwritten list, handwritten outline, handwritten text, handwritten tables, border lines, handwritten diagrams, mixed structure and free-form commands and table alignment;
 selecting which of said plurality of objects are to be edited on said display device in response to entry of an editing command by a user of said computer, said editing being appropriate for the structure of the selected objects, and said editing including a prime change to said selected objects and any contextual changes to said objects not selected but which occurs due to said prime change;
 determining one or more parameters for each of said changes to be animated;
 determining in how many iterations N an animation should occur; and
 performing said animation for said prime change and any of said contextual changes, in iterations including at least, for each of said iterations, erasing each of said objects which are to be manipulated and displaying each of said objects which are to be manipulated an additional 1/N of a total change set by said one or more parameters over a preceding of said iterations, said animation being performed automatically at a visually apparent rate.

27. The method of claim 26 wherein all of said iterations occur in a time period of 1 second or less but greater than 0 second.

28. The method of claim 26 wherein all of said plurality of objects which are to be manipulated are manipulated simultaneously.

29. The method of claim 26 wherein each of said plurality of objects which are to be manipulated are manipulated in sequence.

30. A method for animating editing changes to a plurality of objects on a display device of a computer comprising the steps of:
 operating the computer under a gesture-based graphical editing environment, wherein the objects entered into the computer consist of strokes which are amenable to stroke operations, wherein there are no pre-defined structural groupings of the strokes by the gesture-based graphical editing system, and wherein the gesture-based editing system can, on demand, interpret a set of the strokes as any one of several different kinds of structures;
 inputting a gesture command in association with a selected portion of the objects on the display device, the gesture causing the selected objects to temporarily be regarded as a particular kind of structure;

selecting which of said plurality of objects are to be edited on said display device in response to entry of an editing command by a user of said computer, said editing being appropriate for the structure of the selected objects, and said editing including a prime change to said selected objects and any contextual changes to said objects not selected by said editing command but which occur due to said prime change;

determining one or more parameters for each of said changes to be animated;

determining in how many iterations N an animation should occur; and performing said animation for said prime change and any of said contextual changes, in iterations including at least, for each of said iterations, erasing each of said plurality of objects which are to be manipulated and displaying each of said plurality of objects which are to be manipulated a distance further along said total change, said distance varying for a first of said iterations from said distance for a second of said iterations, said animation being performed automatically at a visually apparent rate.

31. The method of claim 30 wherein said objects which must be manipulated are animated as changing at a constantly accelerating rate until reaching a top speed as said objects approach their destinations, and thereafter said objects are animated as constantly decelerating until said objects finally reach their destinations.

32. The method of claim 30 wherein all of said iterations occur in a time period of 1 second or less but greater than 0 second.

33. The method of claim 30 wherein all of said plurality of objects which are to be manipulated are manipulated simultaneously.

34. The method of claim 30 wherein each of said plurality of objects which are to be manipulated are manipulated in sequence.

* * * * *

UNITED STATES PATENT AND TRADEMARK OFFICE
CERTIFICATE OF CORRECTION

PATENT NO. : 5,880,743
DATED : March 9, 1999
INVENTOR(S) : Thomas P. Moran, Patrick Chiu, William Van Melle, Gordon Kurtenbach It is certified that error appears in the above-identified patent and that said Letters Patent is hereby corrected as shown below:

Delete Claim 31, page 38, lines 4-9;
Delete Claim 32, page 38, lines 10-12;
Delete Claim 33, page 38, lines 13-15;
Delete Claim 34, page 38, lines 16-18;

Signed and Sealed this

Twenty-third Day of October, 2001

*Attest:*

NICHOLAS P. GODICI
*Acting Director of the United States Patent and Trademark Office*

*Attesting Officer*